(12) United States Patent
Kaufman et al.

(10) Patent No.: US 8,334,327 B2
(45) Date of Patent: Dec. 18, 2012

(54) HIGHLY BREATHABLE BIODEGRADABLE FILMS

(75) Inventors: Ross T. Kaufman, Neenah, WI (US); Vasily A. Topolkaraev, Appleton, WI (US); Steven R. Stopper, Suwanee, GA (US); Rob L. Jacobs, Woodstock, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 415 days.

(21) Appl. No.: 12/373,976

(22) PCT Filed: Aug. 31, 2006

(86) PCT No.: PCT/US2006/034070
§ 371 (c)(1),
(2), (4) Date: Apr. 7, 2009

(87) PCT Pub. No.: WO2008/027046
PCT Pub. Date: Mar. 6, 2008

(65) Prior Publication Data
US 2010/0068484 A1     Mar. 18, 2010

(51) Int. Cl.
*C08J 9/00* (2006.01)
*C08J 9/10* (2006.01)
*B28B 11/08* (2006.01)
*B29C 49/08* (2006.01)
*B29C 55/00* (2006.01)
*C08K 3/26* (2006.01)
*C08K 3/22* (2006.01)
*C09D 17/00* (2006.01)

(52) U.S. Cl. ........... 521/92; 264/291; 524/425; 524/497

(58) Field of Classification Search .......... 264/291; 524/497, 425; 521/82, 92
See application file for complete search history.

(56) References Cited

U.S. PATENT DOCUMENTS

| | | | |
|---|---|---|---|
| 3,137,592 A | 6/1964 | Protzman et al. | |
| 3,655,129 A | 4/1972 | Seiner | |
| 3,963,656 A | 6/1976 | Meisert et al. | |
| 4,174,330 A | 11/1979 | Gilbert et al. | |
| 4,209,417 A | 6/1980 | Whyte | |

(Continued)

FOREIGN PATENT DOCUMENTS
EP        0565386 A1     10/1993
(Continued)

OTHER PUBLICATIONS

AATCC Test Method 127-1998—*Water Resistance: Hydrostatic Pressure Test*, AATCC Technical Manual/2001, pp. 211-212.

(Continued)

*Primary Examiner* — Liam Heincer
(74) *Attorney, Agent, or Firm* — Dority & Manning, P.A.

(57) ABSTRACT

A breathable film having a base layer comprising first filler particles and second filler particles dispersed within a biodegradable polymer matrix is provided. The first filler particles constitute from about 25 wt. % to about 75 wt. % of the base layer and the second filler particles constitute from about 0.1 wt. % to about 10 wt. % of the base layer. The ratio of the average size of the first filler particles to the average size of the second filler particles being from about 2 to about 100. The film exhibits a water vapor transmission rate of about 2,000 $g/m^2/24$ hours or more and a peak load in the machine direction of about 800 grams-force per inch or more.

44 Claims, 5 Drawing Sheets

U.S. PATENT DOCUMENTS

| | | | |
|---|---|---|---|
| 4,797,468 A | 1/1989 | De Vries | |
| 5,028,648 A | 7/1991 | Famili et al. | |
| 5,028,658 A | 7/1991 | David et al. | |
| 5,093,422 A | 3/1992 | Himes | |
| 5,102,465 A | 4/1992 | Lamond | |
| 5,169,706 A | 12/1992 | Collier, IV et al. | |
| 5,292,783 A | 3/1994 | Buchanan et al. | |
| 5,382,611 A | 1/1995 | Stepto et al. | |
| 5,397,834 A | 3/1995 | Jane et al. | |
| 5,446,079 A | 8/1995 | Buchanan et al. | |
| 5,470,944 A | 11/1995 | Bonsignore | |
| 5,523,293 A | 6/1996 | Jane et al. | |
| 5,559,171 A | 9/1996 | Buchanan et al. | |
| 5,580,911 A | 12/1996 | Buchanan et al. | |
| 5,599,858 A | 2/1997 | Buchanan et al. | |
| 5,605,961 A | 2/1997 | Lee et al. | |
| 5,637,631 A * | 6/1997 | Kitada et al. | 524/81 |
| 5,641,562 A | 6/1997 | Larson et al. | |
| 5,665,152 A | 9/1997 | Bassi et al. | |
| 5,695,868 A | 12/1997 | McCormack | |
| 5,747,648 A | 5/1998 | Bassi et al. | |
| 5,770,682 A | 6/1998 | Ohara et al. | |
| 5,783,271 A * | 7/1998 | Nishida et al. | 428/35.5 |
| 5,800,758 A * | 9/1998 | Topolkaraev et al. | 264/154 |
| 5,817,721 A | 10/1998 | Warzelhan et al. | |
| 5,821,327 A | 10/1998 | Oota et al. | |
| 5,855,999 A | 1/1999 | McCormack | |
| 5,880,254 A | 3/1999 | Ohara et al. | |
| 5,900,322 A | 5/1999 | Buchanan et al. | |
| 5,910,545 A | 6/1999 | Tsai et al. | |
| 5,922,379 A | 7/1999 | Wang | |
| 5,931,823 A | 8/1999 | Stokes et al. | |
| 5,932,497 A | 8/1999 | Morman et al. | |
| 5,939,192 A | 8/1999 | Rettenbacher et al. | |
| 5,945,480 A | 8/1999 | Wang et al. | |
| 5,965,708 A | 10/1999 | Bassi et al. | |
| 5,977,312 A | 11/1999 | Bassi et al. | |
| 5,981,012 A | 11/1999 | Pomplun et al. | |
| 5,985,396 A | 11/1999 | Kerins et al. | |
| 5,993,589 A * | 11/1999 | Morman | 156/229 |
| 5,997,981 A | 12/1999 | McCormack et al. | |
| 6,008,276 A | 12/1999 | Kalbe et al. | |
| 6,015,764 A | 1/2000 | McCormack et al. | |
| 6,020,425 A | 2/2000 | Wang et al. | |
| 6,060,638 A | 5/2000 | Paul et al. | |
| 6,063,866 A | 5/2000 | Wang et al. | |
| 6,075,118 A | 6/2000 | Wang et al. | |
| 6,096,809 A | 8/2000 | Lorcks et al. | |
| 6,111,163 A | 8/2000 | McCormack et al. | |
| 6,135,987 A | 10/2000 | Tsai et al. | |
| 6,156,421 A | 12/2000 | Stopper et al. | |
| 6,225,388 B1 | 5/2001 | Tsai et al. | |
| 6,231,970 B1 | 5/2001 | Andersen et al. | |
| 6,235,816 B1 | 5/2001 | Lorcks et al. | |
| 6,258,924 B1 | 7/2001 | Warzelhan et al. | |
| 6,296,914 B1 | 10/2001 | Kerins et al. | |
| 6,297,347 B1 | 10/2001 | Warzelhan et al. | |
| 6,326,458 B1 | 12/2001 | Gruber et al. | |
| 6,348,258 B1 | 2/2002 | Topolkaraev et al. | |
| 6,350,518 B1 | 2/2002 | Schertz et al. | |
| 6,369,215 B1 | 4/2002 | Peltonen et al. | |
| 6,414,108 B1 | 7/2002 | Warzelhan et al. | |
| 6,417,312 B1 | 7/2002 | Kirchmeyer et al. | |
| 6,432,547 B1 * | 8/2002 | Kroll et al. | 428/474.4 |
| 6,461,457 B1 | 10/2002 | Taylor et al. | |
| 6,469,099 B1 | 10/2002 | Farah et al. | |
| 6,517,625 B2 | 2/2003 | Bassi et al. | |
| 6,530,910 B2 | 3/2003 | Pomplun et al. | |
| 6,534,150 B1 * | 3/2003 | Yamanaka et al. | 428/143 |
| 6,544,455 B1 | 4/2003 | Tsai | |
| 6,552,124 B2 | 4/2003 | Wang et al. | |
| 6,552,162 B1 | 4/2003 | Wang et al. | |
| 6,565,640 B1 | 5/2003 | Bengs et al. | |
| 6,569,225 B2 | 5/2003 | Edmundson et al. | |
| 6,605,367 B2 | 8/2003 | Bassi et al. | |
| 6,605,657 B1 | 8/2003 | Favis et al. | |
| 6,660,211 B2 | 12/2003 | Topolkaraev et al. | |
| 6,676,984 B1 | 1/2004 | Sharp et al. | |
| 6,703,115 B2 | 3/2004 | Hale et al. | |
| 6,709,671 B2 | 3/2004 | Zerbe et al. | |
| 6,713,595 B2 | 3/2004 | Chung et al. | |
| 6,746,705 B2 | 6/2004 | Altieri et al. | |
| 6,749,795 B2 | 6/2004 | Murphy | |
| 6,767,961 B1 | 7/2004 | Wang et al. | |
| 6,806,353 B2 | 10/2004 | Zhang et al. | |
| 6,838,403 B2 | 1/2005 | Tsai et al. | |
| 6,890,989 B2 | 5/2005 | Wang et al. | |
| 6,905,759 B2 | 6/2005 | Topolkaraev et al. | |
| 6,921,581 B2 | 7/2005 | Van Gelder et al. | |
| 6,933,335 B1 | 8/2005 | Berger et al. | |
| 6,946,506 B2 | 9/2005 | Bond et al. | |
| 6,958,371 B1 | 10/2005 | Wang et al. | |
| 6,984,426 B2 | 1/2006 | Miksic et al. | |
| 6,987,138 B2 | 1/2006 | Tokiwa et al. | |
| 7,045,650 B2 | 5/2006 | Lawrey et al. | |
| 7,053,151 B2 | 5/2006 | Wang et al. | |
| 7,077,994 B2 | 7/2006 | Bond et al. | |
| 7,098,292 B2 | 8/2006 | Zhao et al. | |
| 7,124,450 B2 | 10/2006 | Davidson | |
| 7,153,354 B2 | 12/2006 | Narayan et al. | |
| 7,153,569 B2 | 12/2006 | Kaufman et al. | |
| 7,235,594 B2 | 6/2007 | Han et al. | |
| 7,297,394 B2 | 11/2007 | Khemani et al. | |
| 7,307,125 B2 | 12/2007 | Chundury et al. | |
| 7,368,160 B2 | 5/2008 | Inglis | |
| 7,402,618 B2 | 7/2008 | Xu | |
| 7,413,731 B2 | 8/2008 | Heltovics et al. | |
| 7,776,020 B2 * | 8/2010 | Kaufman et al. | 604/385.22 |
| 2002/0074691 A1 * | 6/2002 | Mortellite et al. | 264/288.4 |
| 2002/0098341 A1 * | 7/2002 | Schiffer et al. | 428/323 |
| 2003/0015826 A1 * | 1/2003 | Topolkaraev et al. | 264/444 |
| 2003/0021973 A1 * | 1/2003 | Topolkaraev et al. | 428/220 |
| 2003/0035943 A1 * | 2/2003 | Jones et al. | 428/317.9 |
| 2003/0077395 A1 | 4/2003 | Bassi et al. | |
| 2003/0091796 A1 * | 5/2003 | Suekane et al. | 428/156 |
| 2003/0099692 A1 | 5/2003 | Lydzinski et al. | |
| 2003/0162013 A1 * | 8/2003 | Topolkaraev et al. | 428/327 |
| 2003/0180525 A1 * | 9/2003 | Strack et al. | 428/323 |
| 2003/0195293 A1 * | 10/2003 | Lubnin et al. | 524/589 |
| 2003/0232933 A1 | 12/2003 | Lagneaux et al. | |
| 2004/0034149 A1 | 2/2004 | Garcia | |
| 2004/0108611 A1 | 6/2004 | Dennis et al. | |
| 2004/0178139 A1 * | 9/2004 | Suh et al. | 210/488 |
| 2004/0224104 A1 * | 11/2004 | de Vries et al. | 428/32.18 |
| 2004/0224596 A1 * | 11/2004 | Mathis et al. | 442/382 |
| 2005/0014431 A1 * | 1/2005 | Carmody et al. | 442/76 |
| 2005/0112363 A1 * | 5/2005 | Ning | 428/327 |
| 2005/0176331 A1 * | 8/2005 | Martin et al. | 442/396 |
| 2005/0186256 A1 | 8/2005 | Dihel et al. | |
| 2005/0208291 A1 * | 9/2005 | Kaufman et al. | 428/323 |
| 2005/0208294 A1 | 9/2005 | Kaufman et al. | |
| 2005/0244606 A1 | 11/2005 | Egawa | |
| 2006/0135728 A1 | 6/2006 | Peerlings et al. | |
| 2006/0149199 A1 | 7/2006 | Topolkaraev et al. | |
| 2006/0194037 A1 * | 8/2006 | Fink et al. | 428/323 |
| 2006/0251858 A1 * | 11/2006 | Thomas et al. | 428/138 |
| 2007/0031555 A1 | 2/2007 | Axelrod et al. | |
| 2007/0049685 A1 | 3/2007 | Hansel et al. | |
| 2007/0049719 A1 | 3/2007 | Brauer et al. | |
| 2007/0129467 A1 | 6/2007 | Scheer | |
| 2007/0142527 A1 * | 6/2007 | Rosa et al. | 524/425 |
| 2007/0246867 A1 | 10/2007 | Nelson et al. | |
| 2007/0298237 A1 | 12/2007 | Goino et al. | |
| 2008/0147034 A1 | 6/2008 | Wang et al. | |
| 2009/0054548 A1 | 2/2009 | Wang et al. | |
| 2009/0117362 A1 * | 5/2009 | Schosseler et al. | 428/220 |
| 2009/0127741 A1 * | 5/2009 | Kurouji et al. | 264/291 |
| 2010/0211034 A1 * | 8/2010 | Fish et al. | 604/359 |

FOREIGN PATENT DOCUMENTS

| | | |
|---|---|---|
| EP | 1235879 B1 | 5/2004 |
| EP | 1075188 B1 | 11/2005 |
| MX | 2004009569 A1 * | 4/2005 |
| WO | WO 0136535 A1 | 5/2001 |
| WO | WO 0151546 A1 | 7/2001 |
| WO | WO 02053376 A2 | 7/2002 |

| | | | |
|---|---|---|---|
| WO | WO 02053376 A3 | 7/2002 |
| WO | WO 2005113616 A2 | 12/2005 |
| WO | WO 2005113616 A3 | 12/2005 |

OTHER PUBLICATIONS

ASTM D 1238-04c—*Standard Test Method for Melt Flow Rates of Thermoplastics by Extrusion Plastometer*, Current Edition 2004, Originally Approved 1965, 14 pages.

ASTM D 1343-56—*Standard Method of Test for Viscosity of Cellulose Derivatives by Ball-Drop Method*, Adopted 1956, pp. 486-489.

ASTM D 1505-03—*Standard Test Method for Density of Plastics by the Density-Gradient Technique*, Current edition approved Nov. 1, 2003, Originally approved in 1957, pp. 1-7.

ASTM D 1525-07—*Standard Test Method for Vicat Softening Temperature of Plastics*, Current edition approved Mar. 1, 2007, Originally approved in 1958, pp. 1-9.

ASTM D 3418-03 (D 3417-99)—*Standard Test Method for Transition Temperatures and Enthalpies of Fusion and Crystallization of Polymers by Differential Scanning Calorimetry*, Current edition approved Dec. 1, 2003, Originally approved in 1976, pp. 66-72.

ASTM D 3806-98 (Reapproved 2004)—*Standard Test Method of Small-Scale Evaluation of Fire-Retardant Paints (2-Foot Tunnel Method)*, Current edition approved Jun. 1, 2004, Originally approved in 1979, pp. 1-6.

ASTM D 5034-95—*Standard Test Method for Breaking Strength and Elongation of Textile Fabrics (Grab Test)*, Current edition approved May 15, 1995, pp. 674-681.

ASTM D 5338-92—*Standard Test Method for Determining Aerobic Biodegradation of Plastic Materials Under Controlled Composting Conditions*, Current edition approved Dec. 15, 1992, pp. 456-461.

ASTM D 6340-98 (Reapproved 2007),—*Standard Test Methods for Determining Aerobic Biodegradation of Radiolabeled Plastic Materials in an Aqueous of Compost Environment*, Current edition 2007, Originally approved 1998, 3 pages.

ASTM D 638-98—*Standard Test Method for Tensile Properties of Plastics*, Current edition approved Sep. 10, 1998, pp. 45-57.

ASTM D 790-99—*Standard Test Methods for Flexural Properties of Unreinforced and Reinforced Plastics and Electrical Insulating Materials*, Current edition approved Nov. 10, 1999, pp. 150-158.

ASTM D 882-02—*Standard Test Method for Tensile Properties of Thin Plastic Sheeting*, 2002, pp. 1-10.

Federal Test Method Standard No. 191A, Method 5514—*Water Resistance of Cloth; Low Range, Hydrostatic Pressure Method*, Jul. 20, 1978, 3 pages.

IST 70.4 (99), INDA, Association of the Nonwoven Fabric Industry—*Standard Test Method for Water Vapor Transmission Rate through Non Woven and Plastic Film Using a Guard Film and Vapor Pressure Sensor*, 1995, 7 pages.

IST 80.4 (01), INDA, Association of the Nonwoven Fabrics Industry—*Standard Test Method for Water Resistance Using the Hydrostatic Pressure Test*, 2001, 7 pages.

Article—*Aging Properties of Films of Plasticized Vital Wheat Gluten Cast from Acidic and Basic Solutions*, Olabarrieta et al., Biomacromolecules, vol. 7, No. 5, 2006, pp. 1657-1664.

Article—*Biodegradable Compositions by Reactive Processing of Aliphatic Polyester/Polysaccharide Blends*, Dubois et al., Macromol. Symp., vol. 198, 2003, pp. 233-243.

Article—*Biodegradable Soy Protein-Polyester Blends by Reactive Extrusion Process*, Graiver et al., Journal of Applied Polymer Science, vol. 92, 2004, pp. 3231-3239.

Article—*Chemical Modification of Starch*, Tomasik et al., Advances in Carbohydrate Chemistry and Biochemistry, vol. 59, 2004, pp. 175-316.

Article—*Edible Protein Films and Coatings*, Food Proteins and Their Applications edited by S. Damodaran and A. Paraf, John M. Krochta, 1997, pp. 529-539.

Article—*Effects of Extruder Die Nozzle Dimensions on Expansion and Micrographic Characterization During Extrusion of Acetylated Starch*, Ganjyal et al., Starch/Stärke, vol. 56, 2004, pp. 108-117.

Article—*Extrusion of Wheat Gluten Plasticized with Glycerol: Influence of Process Conditions on Flow Behavior, Rheological Properties and Molecular Size Distribution*, Redl et al., Cereal Chemistry, vol. 76, No. 3, 1999, pp. 361-370.

Article—*Glycol Glucosides from Starch by Continuous Twin-Screw Extruder Processing*, Carr et al., Cereal Chemistry, vol. 66, No. 3, 1989, pp. 238-243.

Article—*Heat and shear mediated polymerization of plasticized wheat gluten protein upon mixing*, Redl et al., Journal of Cereal Science 38, 2003, pp. 105-114.

Article—*Polyurethane/Polyolefin Blends: Morphology, Compatibilization and Mechanical Properties*, Wang et al., Polymers & Polymer Composites, vol. 14, No. 1, 2006, 11 pages.

Article—*Preparation of Acetylated Distarch Adipates by Extrusion*, Mail et al., Lebensmittel-Wissenschaft und-Technologie, vol. 34, No. 6, 2001, pp. 384-389.

Article—*Reactivity of Wheat Gluten Protein during Mechanical Mixing: Radical and Nucleophilic Reactions for the Addition of Molecules on Sulfur*, Auvergne et al., Biomacromolecules, vol. 9, No. 2, 2008, pp. 664-671.

Article—*Soy Protein-Based Biodegradable Plastics*, Mungara et al., Proceedings in Plastics Impact on the Environment Conference, Society of Plastic, Feb. 2003, pp. 393-397.

Article—*Starch Modification, Destruction and Hydrolysis during O-Formylation*, Divers et al., Starch/Stärke 56, 2004, pp. 389-398.

Article—*The chemical modification of a range of starches under aqueous reaction conditions*, Fang et al., Carbohydrate Polymers 55, 2004, pp. 283-289.

Article—*The History of Tomorrow's Materials: Protein-Based Biopolymers*, Ralston et al., Plastics Engineering, Feb. 2008, pp. 36-40.

Article—*The Hydroxypropylation of Starch in a Self-Wiping Twin Screw Extruder*, De Graaf et al., Advances in Polymer Technology, vol. 22, No. 1, 2003, pp. 56-68.

Article—*Thermoplastic Processing of Protein-Based Bioplastics: Chemical Engineering Aspects of Mixing, Extrusion and Hot Molding*, Pommet et al., Macromol. Symp., vol. 197, 2003, pp. 207-217.

Article—*Thermoplastic Processing of Proteins for Film Formation—A Review*, Hernandez-Izquierdo et al., Journal of Food Science, vol. 73, No. 2, 2008, pp. R30-R39.

International Search Report and Written Opinion for PCT/US2006/034070, Mar. 8, 2007.

Related U.S. Patent Applications.

Abstract of Japanese Patent No. JP2006137847 dated Jun. 1, 2006, 1 page.

Abstract of Japanese Patent No. JP2006505719 dated Feb. 16, 2006, 1 page.

\* cited by examiner

HIGHLY BREATHABLE BIODEGRADABLE FILMS

BACKGROUND OF THE INVENTION

Disposable absorbent products (e.g., diapers, feminine hygiene products, incontinence products, etc.) are subjected to one or more liquid insults, such as of water, urine, menses, or blood, during use. Many commercially available diapers allow water vapor to pass through the diaper and into the environment to lessen the amount of moisture held against the skin and reduce the chance of skin irritation and rash due to skin overhydration. To allow the passage of vapor through the diaper and into the environment while holding liquid, a "breathable" outer cover is often employed that is formed from a nonwoven web laminated to a film. The film contains a filler (e.g., calcium carbonate) that causes a series of micropores to develop in the film when stretched. The micropores form what is often referred to as "tortuous pathways" through the film. Liquid contacting one side of the film does not have a direct passage through the film. Instead, a network of microporous channels in the film prevents liquids from passing, but allows gases and water vapor to pass.

One shortcoming with such microporous films is that they are generally formed from polyolefins (e.g., LLDPE), which are not biodegradable. Consequently, various attempts have been made to form microporous films from biodegradable polymers. Problems have been encountered, however, in forming microporous biodegradable films with a high breathability. Specifically, biodegradable polymers normally have a density that is greater (e.g., 30% greater) than the density of conventional polyolefins. Thus, when blended with such biodegradable polymers, the filler actually occupies a higher volume than it would otherwise occupy when blended with polyolefins at the same weight percentage. Due to this higher relative volume, the "ceiling" or maximum amount of filler that can be added to the film, without undesirably increasing the film modulus and reducing film stretchability, is lowered. However, because high breathability is normally achieved by using a high level of filler, the lower "ceiling" of the filler limits the extent to which the breathability of the biodegradable film may be increased using conventional techniques. Another complicating factor is that many biodegradable polymers are also tackier than polyolefins. This tackiness makes it difficult for the polymer to release or debond from the filler particles, thereby resulting in smaller pores, which leads to lower breathability. Further, attempts to enhance breathability by increased stretching typically results in an increased number of film defects (e.g., holes) that result in breaks and/or reduced tensile properties.

As such, a need currently exists for a technique of improving the breathability of biodegradable films.

SUMMARY OF THE INVENTION

In accordance with one embodiment of the present invention, a breathable film is disclosed that has a base layer comprising first filler particles and second filler particles dispersed within a biodegradable polymer matrix. The first filler particles constitute from about 25 wt. % to about 75 wt. % of the base layer and the second filler particles constitute from about 0.1 wt. % to about 10 wt. % of the base layer. Further, the ratio of the average size of the first filler particles to the average size of the second filler particles is from about 2 to about 100. The film exhibits a water vapor transmission rate of about 2,000 g/m$^2$/24 hours or more and a peak load in the machine direction of about 800 grams-force per inch or more.

In accordance with another embodiment of the present invention, a method for forming a breathable film is disclosed. The method comprises compounding a biodegradable polymer, first filler particles, and second filler particles to form a polymer composition. The first filler particles constitute from about 25 wt. % to about 75 wt. % of the polymer composition and the second filler particles constitute from about 0.1 wt. % to about 10 wt. % of the polymer composition. Further, the ratio of the average size of the first filler particles to the average size of the second filler particles is from about 2 to about 100. The polymer composition is extruded to form a precursor film. The precursor film is stretched in the machine direction, cross-machine direction, or both. The stretched film exhibits a water vapor transmission rate of about 2,000 g/m$^2$/24 hours or more and a peak load in the machine direction of about 800 grams-force per inch or more.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
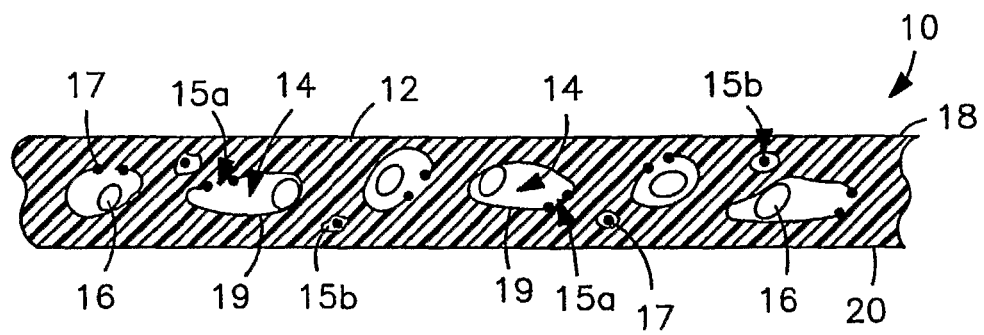
FIG. 1 is a cross-sectional view of one embodiment of a monolayer stretch-thinned breathable film of the present invention.

Repeat use of references characters in the present specification and drawings is intended to represent same or analogous features or elements of the invention.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

Definitions

As used herein, the term "biodegradable" or "biodegradable polymer" generally refers to a material that degrades from the action of naturally occurring microorganisms, such as bacteria, fungi, and algae; environmental heat; moisture; or other environmental factors. The biodegradability of a material may be determined using ASTM Test Method 5338.92.

As used herein, the term "breathable" means pervious to water vapor and gases, but impermeable to liquid water. The "breathability" of a material is measured in terms of water vapor transmission rate (WVTR), with higher values representing a more breathable material and lower values representing a less breathable material. The "water vapor transmission rate" (WVTR) generally refers to the rate at which water vapor permeates through a material as measured in units of grams per meter squared per 24 hours (g/m²/24 hrs). The test used to determine the WVTR of a material may vary based on the nature of the material. For instance, one technique for measuring WVTR involves the use of a PERMATRAN-W 100K water vapor permeation analysis system, which is commercially available from Modern Controls, Inc. of Minneapolis, Minn. Such a system may be particularly well suited for materials thought to have a WVTR of greater than about 2,000 g/m²/24 hrs. It should be understood, however, that other systems and techniques for measuring WVTR may also be utilized in the present invention.

As used herein, the term "nonwoven web" refers to a web having a structure of individual threads (e.g., fibers or filaments) that are randomly interlaid, not in an identifiable manner as in a knitted fabric. Nonwoven webs include, for example, meltblown webs, spunbond webs, carded webs, wet-laid webs, airlaid webs, coform webs, hydraulically entangled webs, etc. The basis weight of the nonwoven web may generally vary, but is typically from about 5 grams per square meter ("gsm") to 200 gsm, in some embodiments from about 10 gsm to about 150 gsm, and in some embodiments, from about 15 gsm to about 100 gsm.

As used herein, the term "meltblown web" generally refers to a nonwoven web that is formed by a process in which a molten thermoplastic material is extruded through a plurality of fine, usually circular, die capillaries as molten fibers into converging high velocity gas (e.g. air) streams that attenuate the fibers of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, et al., which is incorporated herein in its entirety by reference thereto for all purposes. Generally speaking, meltblown fibers may be microfibers that are substantially continuous or discontinuous, generally smaller than 10 micrometers in diameter, and generally tacky when deposited onto a collecting surface.

As used herein, the term "spunbond web" generally refers to a web containing small diameter substantially continuous filaments. The filaments are formed by extruding a molten thermoplastic material from a plurality of fine, usually circular, capillaries of a spinnerette with the diameter of the extruded filaments then being rapidly reduced as by, for example, eductive drawing and/or other well-known spunbonding mechanisms. The production of spunbond webs is described and illustrated, for example, in U.S. Pat. Nos. 4,340,563 to Appel, et al., 3,692,618 to Dorschner, et al., 3,802,817 to Matsuki, et al., 3,338,992 to Kinney, 3,341,394 to Kinney, 3,502,763 to Hartman, 3,502,538 to Levy, 3,542,615 to Dobo, et al., and 5,382,400 to Pike et al., which are incorporated herein in their entirety by reference thereto for all purposes. The filaments may, for example, have a length much greater than their diameter, such as a length to diameter ratio ("aspect ratio") greater than about 15,000 to 1, and in some cases, greater than about 50,000 to 1. The filaments may sometimes have diameters less than about 40 micrometers, and are often between about 5 to about 20 micrometers.

Detailed Description

Generally speaking, the present invention is directed to a biodegradable film exhibiting high breathability. More specifically, the film employs two or more fillers of predetermined sizes. For example, the film may employ a first filler having an average size that is greater than the average size of a second filler. That is, the ratio of the average size of the first filler to the average size of the second filler may range from about 2 to about 100, in some embodiments from about 5 to about 50, and in some embodiments, from about 10 to about 20. For example, the first filler may have an average size of from about 0.5 to about 10 micrometers, in some embodiments, from about 1 to about 8 micrometers, and in some embodiments, from about 2 to about 6 micrometers. In contrast, the second filler may have an average size of from about 0.01 to about 5 micrometers, in some embodiments from about 0.05 to about 2 micrometers, and in some embodiments, from about 0.1 to about 1 micrometer.

The use of fillers of different sizes may create a pore structure that enhances the molecular diffusion of water vapor through the film. The smaller second filler, for example, may form small pores in the cell walls of large pores formed by the larger first filler. The resulting pore structure may thus contain two or more distinct sizes of pores, i.e., a "multimodal" distribution. A first class of pores, for instance, may be characterized as having an average length of from about 5 to about 100 micrometers, in some embodiments from about 6 to about 50 micrometers, and in some embodiments, from about 10 to about 30 micrometers. A smaller second class of pores may likewise have an average length of from about 0.5 to about 5 micrometers, in some embodiments from about 0.8 to about 4 micrometers, and in some embodiments, from about 1 to about 2 micrometers. Among other things, such smaller pores may help connect adjacent large pores. Of course, the film may also contain other classes of pores, such as those of an even smaller size, e.g., about 0.5 micrometers or less.

Regardless, the pore structure of the film allows it to exhibit a high breathability, such as a water vapor transmission rate (WVTR) of about 2,000 grams/m²-24 hours or more, in some embodiments about 5,000 grams/m²-24 hours or more, in some embodiments about 7,000 grams/m²-24 hours or more, and in some embodiments, about 10,000 grams/m²-24 hours or more. The film may also limit the amount of liquid water that passes therethrough upon the application of pressure, i.e., it resists a hydrostatic pressure ("hydrohead") of about 50 millibar or more, in some embodiments about 70 millibar or more, in some embodiments about 80 millibar or more, and in some embodiments, about 100 millibar or more without allowing liquid water to pass.

Despite achieving such high breathability, the film of the present invention is still able to retain good mechanical properties. For example, the film of the present invention may exhibit a relatively high "peak load", which indicates the maximum load to break as expressed in units of grams-force per inch. The MD peak load may, for instance, be about 800 grams-force per inch ("g$_f$/in") or more, in some embodiments about 1200 g$_f$/in or more, and in some embodiments, about 1500 g$_f$/in or more. The film of the present invention may also exhibit a relatively high a peak elongation (i.e., the percent elongation at its peak load) in the machine direction ("MD"), such as about 15% or more, in some embodiments about 25% or more, and in some embodiments, about 40% or more.

The unique combination of breathability and mechanical properties achieved in the present invention is due, at least in part, to the fact that the total pore volume of the film does not substantially increase, and may even be reduced, upon the addition of the smaller second filler (at a constant first filler content). Without intending to be limited by theory, it is believed that the smaller second filler may potentially inhibit or block the formation of pores in the film normally formed around the larger filler. Thus, the total pore volume remains substantially the same or is even reduced. For example, the film of the present invention may have a total pore volume that is less than an otherwise identical film that lacks the smaller second filler (e.g., the same first filler content, same polymer content, same basis weight, etc.). The degree to which the total pore volume is less may vary, but may be about 2% or less, in some embodiments about 4% or less, and in some embodiments, about 10% or less, wherein the percentage is calculated by first subtracting the total pore volume of the film without a smaller second filler by the total pore volume with a smaller second filler, dividing by the total pore volume of the film without a smaller second filler, and then multiplying by 100.

The beneficial properties of the film of the present invention may be achieved without necessarily requiring an increase in the total filler content beyond conventional levels. That is, the total filler content in the film may range from about 30 wt. % to about 75 wt. %, in some embodiments, from about 35 wt. % to about 70 wt. %, and in some embodiments, from about 40 wt. % to about 65 wt. %. For example, the larger first filler may constitute from about 25 wt. % to about 75 wt. %, in some embodiments, from about 30 wt. % to about 70 wt. %, and in some embodiments, from about 40 wt. % to about 60 wt. % of the film. The smaller second filler may constitute from about 0.1 wt. % to about 10 wt. %, in some embodiments, from about 0.5 wt. % to about 6 wt. %, and in some embodiments, from about 1 wt. % to about 4 wt. % of the film. Likewise, the biodegradable polymer may constitute from about 25 wt. % to about 70 wt. %, in some embodiments, from about 30 wt. % to about 65 wt. %, and in some embodiments, from about 35 wt. % to about 60 wt. % of the film. In addition, the larger first filler may constitute about 75 wt. % or more, in some embodiments about 85 wt. % or more, and in some embodiments, about 95 wt. % or more of the total filler employed in the film, while the smaller second filler may constitute about 25 wt. % or less, in some embodiments about 15 wt. % or less, and in some embodiments, about 5 wt. % or less of the total filler employed in the film.

The fillers may be formed from the same or different types of particles. For example, suitable particles may include calcium carbonate, various kinds of clay, silica, alumina, barium carbonate, sodium carbonate, magnesium carbonate, talc, barium sulfate, magnesium sulfate, aluminum sulfate, titanium dioxide, zeolites, cellulose-type powders, kaolin, mica, carbon, calcium oxide, magnesium oxide, aluminum hydroxide, pulp powder, wood powder, cellulose derivatives, chitin and chitin derivatives, cyclodextrins, synthetic polymers (e.g., polystyrene), and so forth. Still other suitable particles are described in U.S. Pat. Nos. 6,015,764 and 6,111,163 to McCormack, et al.; 5,932,497 to Morman, et al.; 5,695,868 to McCormack; 5,855,999 to McCormack, et al.; 5,997,981 to McCormack et al.; and 6,461,457 to Taylor, et al., which are incorporated herein in their entirety by reference thereto for all purposes. In one particular embodiment, the larger first filler is formed from calcium carbonate and the smaller second filler is formed from a relatively rigid particle, such as titanium dioxide, silica, polystyrene, and so forth.

If desired, the type of calcium carbonate employed for the first filler may be selected to enhance breathability. For example, calcium carbonate particles may be employed that have a purity of at least about 95 wt. %, in some embodiments at least about 98 wt. %, and in some embodiments, at least about 99 wt. %. Such high purity calcium carbonates are generally fine, soft, and round, and thus provide a more controlled and narrow particle size for improving the breathability of the film. An example of such a high purity calcium carbonate is Caribbean micritic calcium carbonate, which is mined from soft and friable, finely divided, chalk-like marine sedimentary deposits frequently occurring as surface deposits in the Caribbean (e.g., Jamaica). Such calcium carbonates typically have an average particle size of about 10 micrometers or less, and desirably about 6 micrometers or less. Other examples of Caribbean micritic calcium carbonates are described in U.S. Pat. No. 5,102,465 to Lamond, which is incorporated herein in its entirety by reference thereto for all purposes. Such calcium carbonates may be wet or dry ground, and classified into a narrow particle size distribution with round or spherical-shaped particles. One particularly suitable micritic calcium carbonate is available from Specialty Minerals under the designation "MD1517."

Although not required, the fillers(s) may optionally be coated with a modifier (e.g., fatty acid, such as stearic acid or behenic acid) to facilitate the free flow of the particles in bulk and their ease of dispersion into the biodegradable polymer. Further, the filler(s) may also be coated with a liquid additive to reduce coupling at the resin-filler interface and facilitate debonding of filler from polymer matrix during stretching. This is especially useful for the polar biodegradable polymers, which demonstrate strong interaction with fillers. Examples of such additives include surfactants, such as silicone glycol copolymers available from Dow Corning Corporation. Other suitable additives for this purpose may include titanates available from Kenrich Petrochemicals, Inc. of Bayonne, N.J. under the designations Ken-React® LICA® 01, React® LICA® 12, Ken-React® CAPOW®, Ken-React® CAPS® and zirconates available from Kenrich under the designation Ken-React® CAPS NZ 01/L. The filler(s) may be precompounded with such additives before mixing with the resin, or the additives may be compounded with the resin and fillers at the melt-blending step.

In addition to the fillers, the film of the present invention also includes a biodegradable polymer. Examples of suitable biodegradable polymers include aliphatic polyesters, such as polyesteramides, modified polyethylene terephthalate, polylactic acid (PLA) and its copolymers, terpolymers based on polylactic acid, polyglycolic acid, polyalkylene carbonates (such as polyethylene carbonate), polyhydroxyalkanoates (PHA), polyhydroxybutyrates (PHB), polyhydroxyvalerates (PHV), polyhydroxybutyrate-hydroxyvalerate copolymers (PHBV), polyhydroxyvalerate, polyhydroxybutyrate-hydroxyvalerate copolymer and polycaprolactone), and succinate-based aliphatic polymers (e.g., polybutylene succinate, polybutylene succinate adipate, and polyethylene succinate); aromatic polyesters; and aliphatic-aromatic copolyesters.

In one particular embodiment, the biodegradable polymer is an aliphatic-aromatic copolyester (e.g., block, random, graft, etc.). Aliphatic-aromatic polyesters are typically synthesized through the condensation polymerization of a polyol in conjunction with aliphatic and aromatic dicarboxylic acids or anhydrides thereof. The polyols may be substituted or unsubstituted, linear or branched, polyols selected from polyols containing 2 to about 8 carbon atoms, polyalkylene ether glycols containing 2 to 8 carbon atoms, and cycloaliphatic diols containing about 4 to about 12 carbon atoms. Substituted polyols typically contain 1 to about 4 substituents independently selected from halo, $C_6$-$C_{10}$ aryl and $C_1$-$C_4$ alkoxy. Examples of polyols that may be used include, but are not limited to, ethylene glycol, diethylene glycol, propylene glycol, 1,3-propanediol, 2,2-dimethyl-1,3-propanediol, 1,3-butanediol, 1,4-butanediol, 1,5-pentanediol, 1,6-hexanediol, polyethylene glycol, diethylene glycol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, triethylene glycol, and tetraethylene glycol. Preferred polyols include 1,4-butanediol; 1,3-propanediol; ethylene glycol; 1,6-hexanediol; diethylene glycol; and 1,4-cyclohexanedimethanol.

Representative aliphatic dicarboxylic acids that may be used include substituted or unsubstituted, linear or branched, non-aromatic dicarboxylic acids selected from aliphatic dicarboxylic acids containing 2 to about 12 carbon atoms and cycloaliphatic dicarboxylic acids containing about 5 to about 10 carbon atoms. The substituted non-aromatic dicarboxylic acids will typically contain 1 to about 4 substituents selected from halo, $C_6$-$C_{10}$aryl, and $C_1$-$C_4$ alkoxy. Non-limiting examples of aliphatic and cycloaliphatic dicarboxylic acids include malonic, succinic, glutaric, adipic, pimelic, azelaic, sebacic, fumaric, 2,2-dimethyl glutaric, suberic, 1,3-cyclopentanedicarboxylic, 1,4-cyclohexanedicarboxylic, 1,3-cyclohexanedicarboxylic, diglycolic, itaconic, maleic, and 2,5-norbornanedicarboxylic. Representative aromatic dicarboxylic acids that may be used include substituted and unsubstituted, linear or branched, aromatic dicarboxylic acids selected from aromatic dicarboxylic acids containing 1 to about 6 carbon atoms. Non-limiting examples of aromatic dicarboxylic acids include terephthalic acid, dimethyl terephthalate, isophthalic acid, dimethyl isophthalate, 2,6-naptha-lene dicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3,4'diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'-methylenebis(benzoate), etc., and mixtures thereof.

The polymerization may be catalyzed by a catalyst, such as a titanium-based catalyst (e.g., tetraisopropyltitanate, tetraisopropoxy titanium, dibutoxydiacetoacetoxy titanium, or tetrabutyltitanate). If desired, a diisocyanate chain extender may be reacted with the copolyester prepolymer to increase its molecular weight. Representative diisocyanates may include toluene 2,4-diisocyanate, toluene 2,6-diisocyanate, 2,4'-diphenylmethane diisocyanate, naphthylene-1,5-diisocyanate, xylylene diisocyanate, hexamethylene diisocyanate ("HMDI"), isophorone diisocyanate and methylenebis(2-isocyanatocyclohexane). Trifunctional isocyanate compounds may also be employed that contain isocyanurate and/or biurea groups with a functionality of not less than three, or to replace the diisocyanate compounds partially by tri- or polyisocyanates. The preferred diisocyanate is hexamethylene diisocyanate. The amount of the chain extender employed is typically from about 0.3 to about 3.5 wt. %, in some embodiments, from about 0.5 to about 2.5 wt. % based on the total weight percent of the polymer.

The copolyesters may either be a linear polymer or a long-chain branched polymer. Long-chain branched polymers are generally prepared by using a low molecular weight branching agent, such as a polyol, polycarboxylic acid, hydroxy acid, and so forth. Representative low molecular weight polyols that may be employed as branching agents include glycerol, trimethylolpropane, trimethylolethane, polyethertriols, glycerol, 1,2,4-butanetriol, pentaerythritol, 1,2,6-hexanetriol, sorbitol, 1,1,4,4,-tetrakis(hydroxymethyl)cyclohexane, tris(2-hydroxyethyl)isocyanurate, and dipentaerythritol. Representative higher molecular weight polyols (molecular weight of 400 to 3000) that may be used as branching agents include triols derived by condensing alkylene oxides having 2 to 3 carbons, such as ethylene oxide and propylene oxide with polyol initiators. Representative polycarboxylic acids that may be used as branching agents include hemimellitic acid, trimellitic (1,2,4-benzenetricarboxylic) acid and anhydride, trimesic (1,3,5-benzenetricarboxylic) acid, pyromellitic acid and anhydride, benzenetetracarboxylic acid, benzophenone tetracarboxylic acid, 1,1,2,2-ethane-tetracarboxylic acid, 1,1,2-ethanetricarboxylic acid, 1,3,5-pentanetricarboxylic acid, and 1,2,3,4-cyclopentanetetracarboxylic acid. Representative hydroxy acids that may be used as branching agents include malic acid, citric acid, tartaric acid, 3-hydroxyglutaric acid, mucic acid, trihydroxyglutaric acid, 4-carboxyphthalic anhydride, hydroxyisophthalic acid, and 4-(beta-hydroxyethyl)phthalic acid. Such hydroxy acids contain a combination of 3 or more hydroxyl and carboxyl groups. Especially preferred branching agents include trimellitic acid, trimesic acid, pentaerythritol, trimethylol propane and 1,2,4-butanetriol.

The aromatic dicarboxylic acid may be present in the aliphatic-aromatic copolyester in an amount of from about 10 mole % to about 30 mole %, in some embodiments from about 15 mole % to about 25 mole %, and in some embodiments, from about 17.5 mole % to about 22.5 mole %. The aliphatic dicarboxylic acid may likewise be present in the aliphatic-aromatic copolyester in an amount of from about 20 mole % to about 40 mole %, in some embodiments from about 25 mole % to about 35 mole %, and in some embodiments, from about 27.5 mole % to about 32.5 mole %. The dihydric alcohol may be present in the aliphatic-aromatic copolyester in an amount of from about 30 mole % to about 60 mole %, in some embodiments from about 45 mole % to about 55 mole %, and in some embodiments, from about 47.5 mole % to about 52.5 mole %.

Regardless of the particular type, biodegradable polymers having a certain combination of thermal and mechanical properties may provide improved Processability and strength to the resulting film. For example, the glass transition temperature ("$T_g$") of the biodegradable polymer may be about 25° C. or less, in some embodiments about 0° C. or less, and in some embodiments, about −10° C. or less. Likewise, the melting point of the biodegradable polymer is typically from about 50° C. to about 160° C., in some embodiments from about 80° C. to about 160° C., and in some embodiments, from about 100° C. to about 140° C.

In addition, the molecular weight of the biodegradable polymer may also be selected to optimize the properties of the film. For instance, biodegradable polymers having too great of a molecular weight generally possess heavily entangled polymer chains and thus result in a thermoplastic composition that is difficult to process. Conversely, biodegradable polymers having too low of a molecular weight do not generally possess enough entanglement, which leads to a relatively weak melt strength and increased tackiness. Thus, the biodegradable polymer employed in the present invention typically has a number average molecular weight ("$M_n$") ranging from about 30,000 to about 180,000 Daltons, in some embodiments from about 50,000 to about 100,000 Daltons, and in some embodiments, from about 60,000 to about 90,000 Daltons. Likewise, the biodegradable polymer also typically has a weight average molecular weight ("$M_w$") ranging from about 50,000 to about 250,000 Daltons, in some embodiments from about 75,000 to about 150,000 Daltons, and in some embodiments, from about 100,000 to about 125,000 Daltons. The molecular weight distribution of the selected polymer is also relatively narrow to enhance polymer processing and provide more consistent properties. That is, the ratio of the weight average molecular weight to the number average molecular weight ("$M_w/M_n$"), i.e., the "polydispersity index", is relatively low. For example, the polydispersity index typically ranges from about 1.0 to about 3.0, in some embodiments from about 1.2 to about 2.0, and in some embodiments, from about 1.4 to about 1.8. The weight and number average molecular weights may be determined by methods known to those skilled in the art.

To provide improved processability, the biodegradable polymer is also selected to have a melt flow index within a certain range. The melt flow index is the weight of a polymer (in grams) that may be forced through an extrusion rheometer orifice (0.0825-inch diameter) when subjected to a force of 2160 grams in 10 minutes at 190° C. Biodegradable polymers having too low of a melt flow index will generally be difficult to process. On the other hand, biodegradable polymers having too high of a melt flow index will generally result in a film lacking sufficient strength. Thus, in most embodiments, the biodegradable polymer has a melt flow index of from about 1 to about 2000 grams per 10 minutes, measured in accordance with ASTM Test Method D1238-E. Of course, the melt flow index of the biodegradable polymer will ultimately depend upon the selected film-forming process. For example, when extruded as a cast film, higher melt flow index polymers are typically desired, such as about 4 grams per 10 minutes or more, in some embodiments, from about 5 to about 12 grams per 10 minutes, and in some embodiments, from about 7 to about 9 grams per 10 minutes. Likewise, when formed as a blown film, lower melt flow index polymers are typically desired, such as less than about 12 grams per 10 minutes or less, in some embodiments from about 1 to about 7 grams per 10 minutes, and in some embodiments, from about 2 to about 5 grams per 10 minutes.

Any of a variety of biodegradable polymers may possess the desired thermal and mechanical properties referenced above. One particular example of a suitable biodegredable polymer is a copolyester containing an aromatic terephtalic acid monomer (~22 mol. %) constituent is available under the designation Ecoflex™ F BX 7011 from BASF Corp. Another example of a suitable copolyester containing an aromatic terephtalic acid monomer (~25 mol. %) constituent is available under the designation Enpol™ 8060M from IRE Chemicals (South Korea). In still another embodiment, polybutylene succinate copolyesters are employed as a polymer in the film. One specific example of a suitable polybutylene succinate polymers is commercially available from IRE Chemicals (South Korea) under the designation Enpol™ G4500.

In addition to the components noted above, other additives may also be incorporated into the film of the present invention, such as melt stabilizers, processing stabilizers, heat stabilizers, light stabilizers, antioxidants, heat aging stabilizers, whitening agents, antiblocking agents, bonding agents, etc. Phosphite stabilizers (e.g., IRGAFOS available from Ciba Specialty Chemicals of Terrytown, N.Y. and DOVERPHOS available from Dover Chemical Corp. of Dover, Ohio) are exemplary melt stabilizers. In addition, hindered amine stabilizers (e.g., CHIMASSORB available from Ciba Specialty Chemicals) are exemplary heat and light stabilizers.

Further, hindered phenols are commonly used as an antioxidant in the production of films. Some suitable hindered phenols include those available from Ciba Specialty Chemicals under the trade name "Irganox®", such as Irganox® 1076, 1010, or E 201. Moreover, bonding agents may also be added to the film to facilitate bonding of the film to additional materials (e.g., nonwoven web). Examples of such bonding agents include hydrogenated hydrocarbon resins. Other suitable bonding agents are described in U.S. Pat. Nos. 4,789,699 to Kieffer et al. and 5,695,868 to McCormack, which are incorporated herein in their entirety by reference thereto for all purposes.

In one particular embodiment, the film may employ a lubricant that helps create an interface between the polymer and fillers, thereby enhancing the degree of debonding that occurs to improve breathability. The lubricant may also migrate to the surface of the film during extrusion to improve its processability. The lubricants are typically liquid at room temperature and substantially immiscible with water. Non-limiting examples of such lubricants include oils (e.g., petroleum based oils, vegetable based oils, mineral oils, natural or synthetic oils, silicone oils, lanolin and lanolin derivatives, kaolin and kaolin derivatives, and so forth); esters (e.g., cetyl palmitate, stearyl palmitate, cetyl stearate, isopropyl laurate, isopropyl myristate, isopropyl palmitate, and so forth); glycerol esters; ethers (e.g., eucalyptol, cetearyl glucoside, dimethyl isosorbicide polyglyceryl-3 cetyl ether, polyglyceryl-3 decyltetradecanol, propylene glycol myristyl ether, and so forth); alkoxylated carboxylic acids; alkoxylated alcohols; fatty alcohols (e.g., octyldodecanol, lauryl, myristyl, cetyl, stearyl and behenyl alcohol, and so forth); etc. In one particular embodiment, the lubricant is alpha tocephrol (vitamin E) (e.g., Irganox® E 201). Other suitable lubricants are described in U.S. Patent Application Publication No. 2005/0258562 to Wilson, et al., which is incorporated herein in its entirety by reference thereto for all purposes. Organopolysiloxane processing aids may also be employed that coat the metal surface of melt-processing equipment and enhance ease of processing. Examples of suitable polyorganosiloxanes are described in U.S. Pat. Nos. 4,535,113; 4,857,593; 4,925,890; 4,931,492; and 5,003,023, which are incorporated herein in their entirety by reference thereto for all purposes. A particular suitable organopolysiloxane is SILQUEST® PA-1, which is commercially available from GE Silicones.

When employed, additives (e.g., lubricant, antioxidant, stabilizer, etc.) may each be present in an amount of from about 0.001 wt. % to about 1 wt. %, in some embodiments, from about 0.005 wt. % to about 1 wt. %, and in some embodiments, from 0.01 wt. % to about 0.5 wt. % of the film.

The microporous film of the present invention may be mono- or multilayered. Referring to FIG. 1, for example, a breathable monolayer film 10 is shown that includes a biodegradable polymer matrix 12, first filler 16, and second filler 17. Upon stretching of the film, a plurality of pores 14 are formed as a result of the polymer breaking away from the first filler 16. In addition, due to the presence of the second filler 17 in the film 10, stretching also causes the formation of smaller perforations or pores 15a in cell walls 19 of the pores 14 and other smaller pores 15b throughout the polymer matrix 12. In this manner, the resulting film 10 has a bimodal pore size distribution that facilitates molecular diffusion of water vapor from a first surface 18 to a second surface 20 of the film 10.

Multilayer films may be prepared in accordance with the present invention by co-extrusion of the layers, extrusion coating, or by any conventional layering process. Such multilayer films normally contain at least one base layer and at least one skin layer, but may contain any number of layers desired. For example, the multilayer film may be formed from a base layer and one or more skin layers, wherein the base layer is formed from a biodegradable polymer, larger first filler, and smaller second filler in accordance with the present invention. In such embodiments, the skin layer(s) may contain a larger first filler and/or smaller second filler, or the layer(s) may be free of a filler. When a skin layer is free of filler, one objective is to alleviate the build-up of filler at the extrusion die lip that may otherwise result from extrusion of a filled film. When a skin layer contains filler, one objective is to provide a suitable bonding layer without adversely affecting the overall breathability of the film.

The skin layer(s) may generally be formed from any film-forming polymer. If desired, the skin layer(s) may contain a softer, lower melting polymer or polymer blend that renders the layer(s) more suitable as heat seal bonding layers for thermally bonding the film to a nonwoven web. In most embodiments, the skin layer(s) are formed from a biodegradable polymer such as described above. It should be understood, however, that other polymers may also be employed in the skin layer(s), either alone or in conjunction with biodegradable polymers, such as polyolefin polymers (e.g., linear low-density polyethylene (LLDPE) or polypropylene). The term "linear low density polyethylene" refers to polymers of ethylene and higher alpha olefin comonomers, such as $C_3$-$C_{12}$ and combinations thereof, having a Melt Index (as measured by ASTM D-1238) of from about 0.5 to about 30 grams per 10 minutes at 190° C. Examples of predominately linear polyolefin polymers include, without limitation, polymers produced from the following monomers: ethylene, propylene, 1-butene, 4-methyl-pentene, 1-hexene, 1-octene and higher olefins as well as copolymers and terpolymers of the foregoing. In addition, copolymers of ethylene and other olefins including butene, 4-methyl-pentene, hexene, heptene, octene, decene, etc., are also examples of predominately linear polyolefin polymers. Additional film-forming polymers that may be suitable for use with the present invention, alone or in combination with other polymers, include ethylene vinyl acetate, ethylene ethyl acrylate, ethylene acrylic acid, ethylene methyl acrylate, ethylene normal butyl acrylate, nylon, ethylene vinyl alcohol, polystyrene, polyurethane, and so forth.

The thickness of the skin layer(s) is generally selected so as not to substantially impair the moisture transmission through the base layer. In this manner, the base layer may determine the breathability of the entire film, and the skin layers will not substantially reduce or block the breathability of the film. To this end, each skin layer may separately comprise from about 0.5% to about 15% of the total thickness of the film, and in some embodiments from about 1% to about 10% of the total thickness of the film. For instance, each skin layer may have a thickness of from about 0.1 to about 10 micrometers, in some embodiments from about 0.5 to about 5 micrometers, and in some embodiments, from about 1 to about 2.5 micrometers. Likewise, the base layer may have a thickness of from about from about 1 to about 40 micrometers, in some embodiments from about 2 to about 25 micrometers, and in some embodiments, from about 5 to about 20 micrometers.

Figure 2:
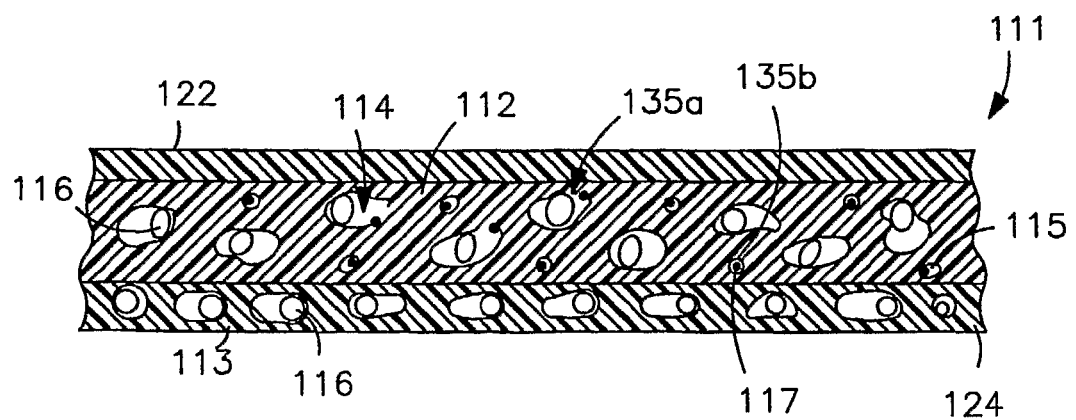
FIG. 2 is a cross-sectional view of one embodiment of a multilayer stretch-thinned breathable film of the present invention.

FIG. 2 illustrates one particular embodiment in which a multilayer stretch-thinned breathable film 111 includes a base layer 115 coextruded between two outer skin layers 122 and 124. The base layer 115 includes a biodegradable polymer matrix 112, first filler 116, and second filler 117. Upon stretching of the film, a plurality of pores 114 are formed as a result of the polymer breaking away from the first filler 116. In addition, due to the presence of the second filler 117 in the film 111, stretching also causes the formation of smaller perforations or pores 135a in cell walls 119 of the pores 114 and other small pores 135b throughout the polymer matrix 112. In this manner, the resulting base layer 115 has a bimodal pore size distribution. In this particular embodiment, the first outer skin layer 122 includes only a biodegradable polymer matrix, and is free of any filler. The second outer skin layer 124 includes a biodegradable polymer matrix 113 and the first filler 116 surrounded by pores 114.

The properties of the resulting film may generally vary as desired. For instance, prior to stretching, the film typically has a basis weight of about 100 grams per square meter or less, and in some embodiments, from about 50 to about 75 grams per square meter. Upon stretching, the film typically has a basis weight of about 60 grams per square meter or less, and in some embodiments, from about 15 to about 35 grams per square meter. The stretched film may also have a total thickness of from about 1 to about 100 micrometers, in some embodiments, from about 10 to about 80 micrometers, and in some embodiments, from about 20 to about 60 micrometers.

Although not necessarily required, the microporous film of the present invention may be laminated to a nonwoven web material. Polymers suitable for making nonwoven webs include, for example, polyolefins, e.g., polyethylene, polypropylene, polybutylene, and so forth; polytetrafluoroethylene; polyesters, e.g., polyethylene terephthalate and so forth; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; polyurethanes; polylactic acid; copolymers thereof; and so forth. If desired, biodegradable polymers, such as those described above, may also be employed. Synthetic or natural cellulosic polymers may also be used, including but not limited to, cellulosic esters; cellulosic ethers; cellulosic nitrates; cellulosic acetates; cellulosic acetate butyrates; ethyl cellulose; regenerated celluloses, such as viscose, rayon, and so forth. It should be noted that the polymer(s) may also contain other additives, such as processing aids or treatment compositions to impart desired properties to the fibers, residual amounts of solvents, pigments or colorants, and so forth.

If desired, the nonwoven web material used to form the nonwoven laminate may itself have a multi-layer structure. Suitable multi-layered materials may include, for instance, spunbond/meltblown/spunbond (SMS) laminates and spunbond/meltblown (SM) laminates. Various examples of suitable SMS laminates are described in U.S. Pat. Nos. 4,041,203 to Brock et al.; 5,213,881 to Timmons, et al.; 5,464,688 to Timmons, et al.; 4,374,888 to Bornslaeger; 5,169,706 to Collier, et al.; and 4,766,029 to Brock et al., which are incorporated herein in their entirety by reference thereto for all purposes. In addition, commercially available SMS laminates may be obtained from Kimberly-Clark Corporation under the designations Spunguard® and Evolution®.

Another example of a multi-layered structure is a spunbond web produced on a multiple spin bank machine in which a spin bank deposits fibers over a layer of fibers deposited from a previous spin bank. Such an individual spunbond nonwoven web may also be thought of as a multi-layered structure. In this situation, the various layers of deposited fibers in the nonwoven web may be the same, or they may be different in basis weight and/or in terms of the composition, type, size, level of crimp, and/or shape of the fibers produced. As another example, a single nonwoven web may be provided as two or more individually produced layers of a spunbond web, a carded web, etc., which have been bonded together to form the nonwoven web. These individually produced layers may differ in terms of production method, basis weight, composition, and fibers as discussed above.

A nonwoven web material may also contain an additional fibrous component such that it is considered a composite. For example, a nonwoven web may be entangled with another fibrous component using any of a variety of entanglement techniques known in the art (e.g., hydraulic, air, mechanical, etc.). In one embodiment, the nonwoven web is integrally entangled with cellulosic fibers using hydraulic entanglement. A typical hydraulic entangling process utilizes high pressure jet streams of water to entangle fibers to form a highly entangled consolidated fibrous structure, e.g., a nonwoven fabric. Hydraulically entangled nonwoven fabrics of staple length and continuous fibers are disclosed, for example, in U.S. Pat. Nos. 3,494,821 to Evans and 4,144,370 to Boulton, which are incorporated herein in their entirety by reference thereto for all purposes. Hydraulically entangled composite nonwoven fabrics of a continuous fiber nonwoven web and a pulp layer are disclosed, for example, in U.S. Pat. Nos. 5,284,703 to Everhart, et al. and 6,315,864 to Anderson, et al., which are incorporated herein in their entirety by reference thereto for all purposes. The fibrous component of the composite may contain any desired amount of the resulting substrate. The fibrous component may contain greater than about 50% by weight of the composite, and in some embodiments, from about 60% to about 90% by weight of the composite. Likewise, the nonwoven web may contain less than about 50% by weight of the composite, and in some embodiments, from about 10% to about 40% by weight of the composite.

Although not required, the nonwoven web material may necked or stretched in one or more directions prior to lamination to the film of the present invention. Alternatively, the nonwoven web may remain relatively inextensible in at least one direction prior to lamination to the film. In such embodiments, the nonwoven web may be optionally stretched in one or more directions subsequent to lamination to the film. In this regard, various embodiments of the lamination method will now be described in greater detail. Of course, it should be understood that the description provided below is merely exemplary, and that other methods are contemplated by the present invention.

Figure 3:
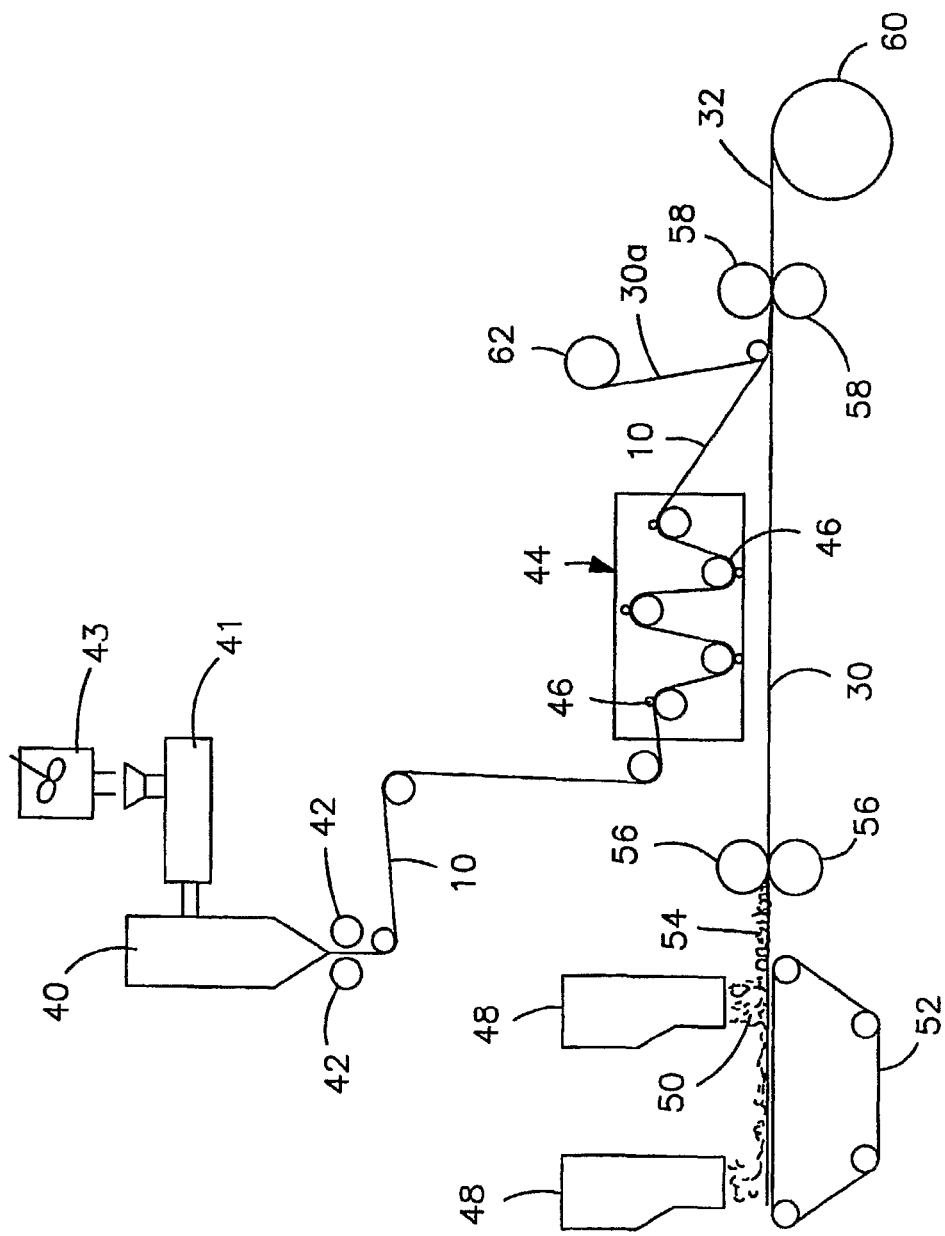
FIG. 3 is a schematic illustration of one embodiment of a method for laminating a breathable film to a nonwoven web in accordance with the present invention.

Referring to FIG. 3, for instance, one embodiment of a method for forming a laminate from a biodegradable film and a nonwoven web material is shown. As shown, the raw materials (e.g., biodegradable polymer, larger first filler, and smaller second filler) may be dry mixed together (i.e., without a solvent) and added to a hopper 43 of an extruder 41. The raw materials may alternatively be blended with a solvent. In the hopper 43, the materials are dispersively mixed in the melt and compounded using any known technique, such as batch and/or continuous compounding techniques that employ, for example, a Banbury mixer, Farrel continuous mixer, single screw extruder, twin screw extruder, etc. Desirably, the raw materials are compounded using a low shear process due to the soft and sensitive nature of the biodegradable polymer. For instance, a mixer/kneader may be employed that operates in conjunction with a single screw compounding extruder to improve its mixing efficiency. The mixers may be formed or integrated directly onto the screw, barrel, or both. For instance, U.S. Pat. No. 6,709,147 to Rauwendaal describes a suitable mixer in which the barrel of the extruder includes one or more axial rows of kneading elements arranged along an inner surface of the screw passageway in a high pressure stage of the extruder, as well as complementary shaped slots formed in the screw flights. In operation, the kneading elements move through the slots of the screw flights to create an efficient mixing action of the melt being pumped therebetween. The kneading elements, teeth or pins, are often press-fit, or threaded into the barrel of the extruder. Such a mixer/kneader (also available under the designation "Buss Ko-Kneader" from Coperion Holding GmbH)) may be employed to compound the materials through a gentle "folding and relaxing" batch process that allows for cooler process temperatures and helps maintain the polymer structure.

Because many biodegradable polymers (e.g., aliphatic-aromatic copolyesters) are hydrophilic, excess moisture may lead to premature degradation and reduced melt strength during film casting. Thus, in some cases, the biodegradable polymer resin may be dried prior to compounding, such as to a moisture content of about 1000 ppm water or less, in some embodiments about 500 ppm water or less, and in some embodiments, about 150 ppm water or less. If desired, a vacuum pressure may be supplied during compounding to remove any excess moisture or low molecular weight factions. The vacuum pressure may be about 500 Torr or less, in some embodiments about 200 Torr or less, and in some embodiments, about 70 Torr or less.

Any known technique may be used to form a film from the compounded material, including blowing, casting, flat die extruding, etc. For example, in the particular embodiment of FIG. 3, the compounded material (not shown) is supplied to an extrusion apparatus 40 and then cast into nip rolls 42 to form a single-layered precursor film 10. If a multilayer film is to be produced, the multiple layers are co-extruded together into the nip rolls 42. One or both of the rolls 42 may optionally be provided with embossing elements to impart a pattern to the film. Typically, the rolls 42 are kept at temperature sufficient to solidify and quench the film 10 as it is formed, such as from about 20 to 60° C. If desired, a vacuum box may be positioned adjacent to the rolls 42 to help keep the precursor film 10 close to the surface of the rolls 42. Additionally, air knives or electrostatic pinners may help force the precursor film 10 against the surface of the rolls 42 as it moves around a spinning roll. An air knife is a device known in the art that focuses a stream of air at a very high flow rate to pin the edges of the film.

Once cast, the precursor film 10 may then be stretched in one or more directions to form pores in the film. Although not required, the film may be stretched in-line without having to remove the film for separate processing. For example, the film may be immediately reheated to a temperature below the melting point of one or more polymers in the film, but high enough to enable the composition to be drawn or stretched. In the case of sequential orientation, the "softened" film is drawn by rolls rotating at different speeds of rotation such that the sheet is stretched to the desired draw ratio in the longitudinal direction (machine direction). This "uniaxially" stretched film may then be laminated to a fibrous web. In addition, the uniaxially stretched film may also be oriented in the cross-machine direction to form a "biaxially stretched" film. For example, the film may be clamped at its lateral edges by chain clips and conveyed into a tenter oven. In the tenter oven, the film may be reheated and drawn in the cross-machine direction to the desired draw ratio by chain clips diverged in their forward travel.

To achieve the desired breathability of the film, various parameters of the stretching operation may be selectively controlled, including the draw ratio, stretching temperature, and so forth. The draw ratio may be determined by dividing the linear speed of the film exiting the stretching operation by the linear speed of the film entering the stretching operation. In some embodiments, for example, the film is stretched in the machine direction at a draw ratio of from about 1.5 to about 10.0, in some embodiments from about 2.0 to about 6.0, and in some embodiments, from about 2.5 to about 5.0. Likewise, the film may be stretched at a temperature less than the melting temperature of the polymers contained therein, such as from about 15° C. to about 60° C., in some embodiments from about 25° C. to about 50° C., and in some embodiments, from about 30° C. to about 40° C. After stretching, the film is optionally heat-set to stabilize the stretched film. Heat-setting may be accomplished at temperatures of from about 40° C. to about 80° C., and in some embodiments, from about 50° C. to about 70° C. The heat-setting operation may reduce shrinkage of the stretched film and improve film properties and breathability. Any known in the art techniques for heat setting could be used including heated rolls and oven setting. Additional treatments may be applied to improve stretched film properties such as surface treatments, UV treatments, ultrasonic treatments, and plasma treatments.

Referring again to FIG. 3, one method for forming a uniaxially stretched film is shown. As illustrated, the precursor film 10 is directed to a film-orientation unit 44 or machine direction orienter ("MDO"), such as commercially available from Marshall and Willams, Co. of Providence, R.I. The MDO has a plurality of stretching rolls 46 (such as from five to fifteen) which progressively stretch and thin the film in the machine direction, which is the direction of travel of the film through the process as shown in FIG. 3. While the MDO 44 is illustrated with five rolls, it should be understood that the number of rolls may be higher or lower, depending on the level of stretch that is desired and the degrees of stretching between each roll. The film may be stretched in either single or multiple discrete stretching operations. It should be noted that some of the rolls in an MDO apparatus may not be operating at progressively higher speeds. If desired, some of the rolls of the MDO 44 may act as preheat rolls. If present, these first few rolls heat the film 10 above room temperature. The progressively faster speeds of adjacent rolls in the MDO act to stretch the film 10. Likewise, if desired, one or more of the rolls of the MDO 44 may also act as heat setting rolls.

A nonwoven web is also employed for laminating to the stretched film 10. For example, the nonwoven web may simply be unwound from a supply roll. Alternatively, as shown in FIG. 3, a nonwoven web 30 may be formed in-line, such as by dispensing polymer filaments 50 from a pair of spinnerettes 48 onto a conveyor assembly 52 to form mat 54. The filaments 50 of mat 54 are then compressed to form inter-filament bonding using a pair of nip rollers 56, resulting in the spunbonded web 30. If desired, a vacuum (not shown) may be utilized to maintain the fibers on the conveyor assembly. Following compaction, the nonwoven web 30 is directed to a nip defined between rolls 58 for laminating to the film 10.

Various techniques may be utilized to bond the film 10 to the nonwoven web 30, including adhesive bonding, such as through slot or spray adhesive systems; thermal bonding; ultrasonic bonding; microwave bonding; extrusion coating; and so forth. Examples of suitable adhesives that may be used in the present invention include Rextac 2730 and 2723 available from Huntsman Polymers of Houston, Tex., as well as adhesives available from Bostik Findley, Inc, of Wauwatosa, Wis. The basis weight of the adhesive may be between about 1.0 and 3.0 grams per square meter. The type and basis weight of the adhesive used will be determined on the attributes desired in the final laminate and end use. Although not required, the adhesive may be applied directly to the nonwoven web prior to lamination with the film. Further, to achieve improved drape, the adhesive may be applied in a pattern. In FIG. 3, the film 10 is simultaneously bonded on its other side to a second material 30a originating from a supply roll 62. The second material 30a may be a second nonwoven web, or another film layer. The resulting laminate 32 is wound and stored on a supply roll 60. If desired, the laminate 32 may also be optionally stretched in the cross-machine and/or machine directions to enhance its extensibility.

The breathable film of the present invention may be used in a wide variety of applications. For example, as indicated above, the breathable film may be used in an absorbent article. An "absorbent article" generally refers to any article capable of absorbing water or other fluids. Examples of some absorbent articles include, but are not limited to, personal care absorbent articles, such as diapers, training pants, absorbent underpants, incontinence articles, feminine hygiene products (e.g., sanitary napkins), swim wear, baby wipes, and so forth; medical absorbent articles, such as garments, fenestration materials, underpads, bedpads, bandages, absorbent drapes, and medical wipes; food service wipers; clothing articles; and so forth. Materials and processes suitable for forming such absorbent articles are well known to those skilled in the art. Typically, absorbent articles include a substantially liquid-impermeable layer (e.g., outer cover), a liquid-permeable layer (e.g., bodyside liner, surge layer, etc.), and an absorbent core. In one particular embodiment, the breathable film of the present invention may be laminated to a nonwoven web material and used to form an outer cover of an absorbent article.

Figure 4:
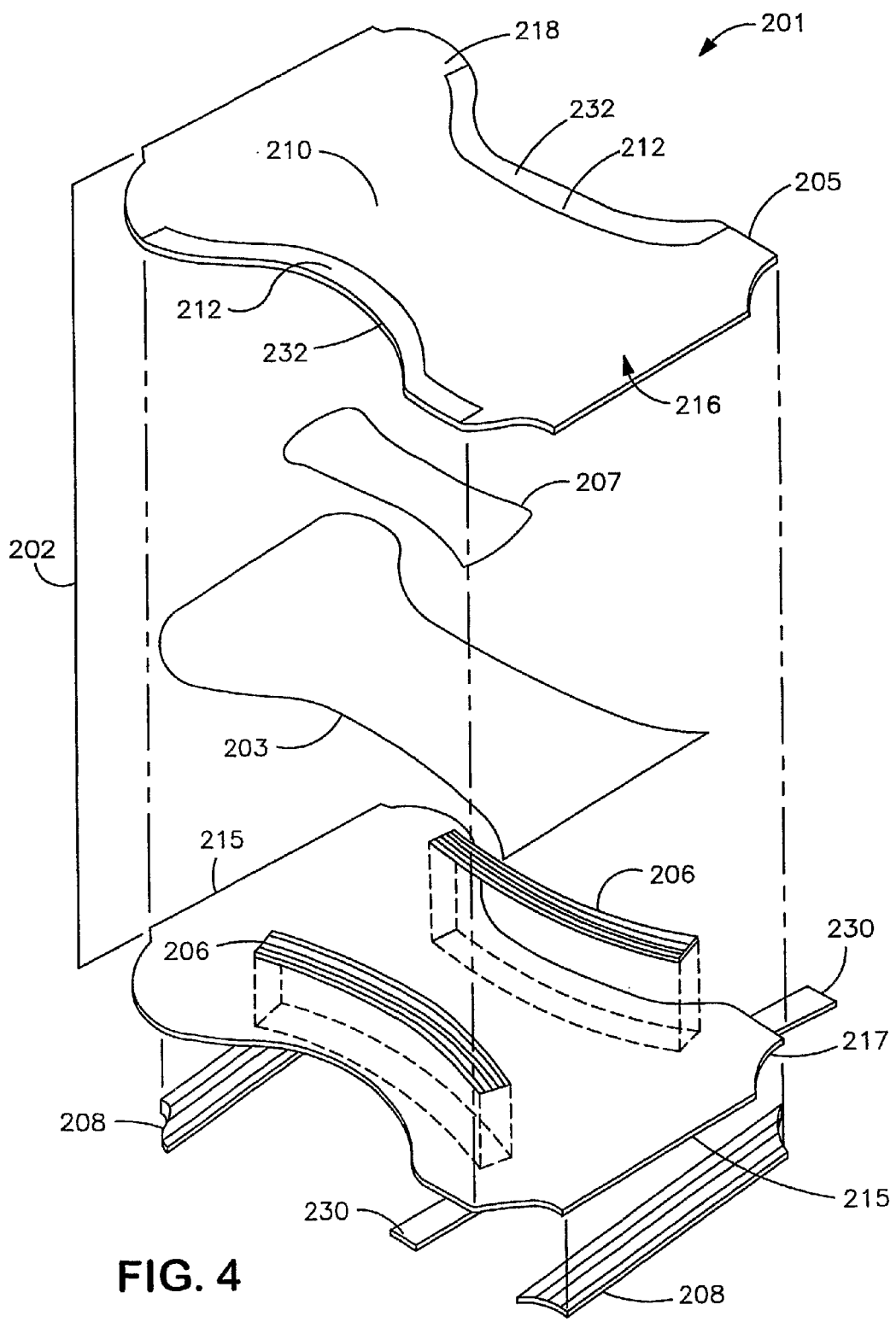
FIG. 4 is a perspective view of an absorbent article that may be formed according to one embodiment of the present invention.

Various embodiments of an absorbent article that may be formed according to the present invention will now be described in more detail. For purposes of illustration only, an absorbent article is shown in FIG. 4 as a diaper 201. However, as noted above, the invention may be embodied in other types of absorbent articles, such as incontinence articles, sanitary napkins, diaper pants, feminine napkins, children's training pants, and so forth. In the illustrated embodiment, the diaper 201 is shown as having an hourglass shape in an unfastened configuration. However, other shapes may of course be utilized, such as a generally rectangular shape, T-shape, or I-shape. As shown, the diaper 201 includes a chassis 202 formed by various components, including an outer cover 217, bodyside liner 205, absorbent core 203, and surge layer 207. It should be understood, however, that other layers may also be used in the present invention. Likewise, one or more of the layers referred to in FIG. 4 may also be eliminated in certain embodiments of the present invention.

The outer cover 217 is typically formed from a material that is substantially impermeable to liquids. For example, the outer cover 217 may be formed from a thin plastic film or other flexible liquid-impermeable material. In one embodiment, the outer cover 217 is formed from the breathable film of the present invention, which permits vapors to escape from the absorbent core 203, but still prevents liquid exudates from passing through the outer cover 217. If a more cloth-like feeling is desired, the breathable film laminated may be laminated to a nonwoven web as described above.

The diaper 201 also includes a bodyside liner 205. The bodyside liner 205 is generally employed to help isolate the wearer's skin from liquids held in the absorbent core 203. For example, the liner 205 presents a bodyfacing surface that is typically compliant, soft feeling, and non-irritating to the wearer's skin. Typically, the liner 205 is also less hydrophilic than the absorbent core 203 so that its surface remains relatively dry to the wearer. The liner 205 may be liquid-permeable to permit liquid to readily penetrate through its thickness. In one particular embodiment, the liner includes a nonwoven web formed in accordance with the present invention. Exemplary liner constructions that contain a nonwoven web are described in U.S. Pat. Nos. 5,192,606; 5,702,377; 5,931,823; 6,060,638; and 6,150,002, as well as U.S. Patent Application Publication Nos. 2004/0102750, 2005/0054255, and 2005/0059941, all of which are incorporated herein in their entirety by reference thereto for all purposes.

As illustrated in FIG. 4, the diaper 201 may also include a surge layer 207 that helps to decelerate and diffuse surges or gushes of liquid that may be rapidly introduced into the absorbent core 203. Desirably, the surge layer 207 rapidly accepts and temporarily holds the liquid prior to releasing it into the storage or retention portions of the absorbent core 203. In the illustrated embodiment, for example, the surge layer 207 is interposed between an inwardly facing surface 216 of the bodyside liner 205 and the absorbent core 203. Alternatively, the surge layer 207 may be located on an outwardly facing surface 218 of the bodyside liner 205. The surge layer 207 is typically constructed from highly liquid-permeable materials. Suitable materials may include porous woven materials, porous nonwoven materials, and apertured films. Other examples of suitable surge layers are described in U.S. Pat. Nos. 5,486,166 to Ellis, et al. and 5,490,846 to Ellis, et al., which are incorporated herein in their entirety by reference thereto for all purposes.

Besides the above-mentioned components, the diaper 201 may also contain various other components as is known in the art. For example, the diaper 201 may also contain a substantially hydrophilic tissue wrapsheet (not illustrated) that helps maintain the integrity of the fibrous structure of the absorbent core 203. The tissue wrapsheet is typically placed about the absorbent core 203 over at least the two major facing surfaces thereof, and composed of an absorbent cellulosic material, such as creped wadding or a high wet-strength tissue. The tissue wrapsheet may be configured to provide a wicking layer that helps to rapidly distribute liquid over the mass of absorbent fibers of the absorbent core 203. The wrapsheet material on one side of the absorbent fibrous mass may be bonded to the wrapsheet located on the opposite side of the fibrous mass to effectively entrap the absorbent core 203.

The diaper 201 may also include a ventilation layer (not shown) that is positioned between the absorbent core 203 and the outer cover 217. When utilized, the ventilation layer may help insulate the outer cover 217 from the absorbent core 203, thereby reducing dampness in the outer cover 217. Examples of such ventilation layers may include a nonwoven web laminated to a breathable film, such as described in U.S. Pat. No. 6,663,611 to Blaney, et al., which is incorporated herein in its entirety by reference thereto for all purposes. Such breathable films may be formed in accordance with the present invention.

The diaper 201 may also include a pair of ears (not shown) that extend from the side edges 232 of the diaper 201 into one of the waist regions. The ears may be integrally formed with a selected diaper component. For example, the ears may be integrally formed with the outer cover 217 or from the material employed to provide the top surface. In alternative configurations, the ears may be provided by members connected and assembled to the outer cover 217, the top surface, between the outer cover 217 and top surface, or in various other configurations. As representatively illustrated in FIG. 4, the diaper 201 may also include a pair of containment flaps 212 that are configured to provide a barrier and to contain the lateral flow of body exudates. The containment flaps 212 may be located along the laterally opposed side edges 232 of the bodyside liner 205 adjacent the side edges of the absorbent core 203. The containment flaps 212 may extend longitudinally along the entire length of the absorbent core 203, or may only extend partially along the length of the absorbent core 203. When the containment flaps 212 are shorter in length than the absorbent core 203, they may be selectively positioned anywhere along the side edges 232 of diaper 201 in a crotch region 210. In one embodiment, the containment flaps 212 extend along the entire length of the absorbent core 203 to better contain the body exudates. Such containment flaps 212 are generally well known to those skilled in the art. For example, suitable constructions and arrangements for the containment flaps 212 are described in U.S. Pat. No. 4,704,116 to Enloe, which is incorporated herein in its entirety by reference thereto for all purposes.

The diaper 201 may include various elastic or stretchable materials, such as a pair of leg elastic members 206 affixed to the side edges 232 to further prevent leakage of body exudates and to support the absorbent core 203. In addition, a pair of waist elastic members 208 may be affixed to longitudinally opposed waist edges 215 of the diaper 201. The leg elastic members 206 and the waist elastic members 208 are generally adapted to closely fit about the legs and waist of the wearer in use to maintain a positive, contacting relationship with the wearer and to effectively reduce or eliminate the leakage of body exudates from the diaper 201. As used herein, the terms "elastic" and "stretchable" include any material that may be stretched and return to its original shape when relaxed. Suitable polymers for forming such materials include, but are not limited to, block copolymers of polystyrene, polyisoprene and polybutadiene; copolymers of ethylene, natural rubbers and urethanes, etc. Particularly suitable are styrene-butadiene block copolymers sold by Kraton Polymers of Houston, Tex. under the trade name Kraton®. Other suitable polymers include copolymers of ethylene, including without limitation ethylene vinyl acetate, ethylene methyl acrylate, ethylene ethyl acrylate, ethylene acrylic acid, stretchable ethylene-propylene copolymers, and combinations thereof. Also suitable are coextruded composites of the foregoing, and elastomeric staple integrated composites where staple fibers of polypropylene, polyester, cotton and other materials are integrated into an elastomeric meltblown web. Certain elastomeric single-site or metallocene-catalyzed olefin polymers and copolymers are also suitable for the side panels.

The diaper 201 may also include one or more fasteners 230. For example, two flexible fasteners 230 are illustrated in FIG. 4 on opposite side edges of waist regions to create a waist opening and a pair of leg openings about the wearer. The shape of the fasteners 230 may generally vary, but may include, for instance, generally rectangular shapes, square shapes, circular shapes, triangular shapes, oval shapes, linear shapes, and so forth. The fasteners may include, for instance, a hook material. In one particular embodiment, each fastener 230 includes a separate piece of hook material affixed to the inside surface of a flexible backing.

The various regions and/or components of the diaper 201 may be assembled together using any known attachment mechanism, such as adhesive, ultrasonic, thermal bonds, etc. Suitable adhesives may include, for instance, hot melt adhesives, pressure-sensitive adhesives, and so forth. When utilized, the adhesive may be applied as a uniform layer, a patterned layer, a sprayed pattern, or any of separate lines, swirls or dots. In the illustrated embodiment, for example, the outer cover 217 and bodyside liner 205 are assembled to each other and to the absorbent core 203 using an adhesive. Alternatively, the absorbent core 203 may be connected to the outer cover 217 using conventional fasteners, such as buttons, hook and loop type fasteners, adhesive tape fasteners, and so forth. Similarly, other diaper components, such as the leg elastic members 206, waist elastic members 208 and fasteners 230, may also be assembled into the diaper 201 using any attachment mechanism.

Although various configurations of a diaper have been described above, it should be understood that other diaper and absorbent article configurations are also included within the scope of the present invention. In addition, the present invention is by no means limited to diapers. In fact, several examples of absorbent articles are described in U.S. Pat. Nos. 5,649,916 to DiPalma, et al.; 6,110,158 to Kielpikowski; 6,663,611 to Blaney, et al., which are incorporated herein in their entirety by reference thereto for all purposes. Still other suitable articles are described in U.S. Patent Application Publication No. 2004/0060112 A1 to Fell et al, as well as U.S. Pat. Nos. 4,886,512 to Damico et al.; 5,558,659 to Sherrod et al.; 6,888,044 to Fell et al.; and 6,511,465 to Freiburger et al., all of which are incorporated herein in their entirety by reference thereto for all purposes.

The present invention may be better understood with reference to the following examples.

Test Methods

Breathability:

The WVTR (water vapor transmission rate) value of was determined using the test procedure standardized by INDA (Association of the Nonwoven Fabrics Industry), number IST-70.4-99, entitled "STANDARD TEST METHOD FOR WATER VAPOR TRANSMISSION RATE THROUGH NONWOVEN AND PLASTIC FILM USING A GUARD FILM AND VAPOR PRESSURE SENSOR", which is incorporated herein in its entirety by reference thereto for all purposes. The INDA test procedure is summarized as follows. A dry chamber is separated from a wet chamber of known temperature and humidity by a permanent guard film and the sample material to be tested. The purpose of the guard film is to define a definite air gap and to quiet or still the air in the air gap while the air gap is characterized. The dry chamber, guard film, and the wet chamber make up a diffusion cell in which the test film is sealed. The sample holder is known as the Permatran-W Model 100K manufactured by Mocon/Modern Controls, Inc., Minneapolis, Minn. A first test is made of the WVTR of the guard film and the air gap between an evaporator assembly that generates 100% relative humidity. Water vapor diffuses through the air gap and the guard film and then mixes with a dry gas flow that is proportional to water vapor concentration. The electrical signal is routed to a computer for processing. The computer calculates the transmission rate of the air gap and the guard film and stores the value for further use.

The transmission rate of the guard film and air gap is stored in the computer as CalC. The sample material is then sealed in the test cell. Again, water vapor diffuses through the air gap to the guard film and the test material and then mixes with a dry gas flow that sweeps the test material. Also, again, this mixture is carried to the vapor sensor. The computer then calculates the transmission rate of the combination of the air gap, the guard film, and the test material. This information is then used to calculate the transmission rate at which moisture is transmitted through the test material according to the equation:

$$TR^{-1}_{test\ material} = TR^{-1}_{test\ material,\ guardfilm,\ airgap} - TR^{-1}_{guardfilm,\ airgap}$$

The water vapor transmission rate ("WVTR") is then calculated as follows:

$$WVTR = \frac{F\rho_{sat(T)}RH}{AP_{sat(T)}(1-RH)}$$

wherein,

F=the flow of water vapor in $cm^3$ per minute;

$\rho_{sat(T)}$=the density of water in saturated air at temperature T;

RH=the relative humidity at specified locations in the cell;

A=the cross sectional area of the cell; and $P_{sat}(T)$=the saturation vapor pressure of water vapor at temperature T.

Hydrostatic Pressure ("Hydrohead"):

The hydrostatic pressure test measures the resistance of a sample to the penetration of water under low hydrostatic pressure. This test procedure is in accordance with Method 5514-Federal Test Methods Standard No. 191A, AATCC Test Method 127-89 and INDA Test method 80.4-92, which are incorporated herein in their entirety by reference thereto for all purposes. The hydrostatic pressure resistance results for each specimen were averaged and recorded in millibars (mbar). A higher value indicates greater resistance to water penetration.

Tensile Properties:

The tensile properties were determined in substantial accordance with ASTM Standard D-882. Specifically, a film sample was cut or otherwise provided with size dimensions that measured 25.4 millimeters (1 inch)×100 millimeters (~4 inches). A constant-rate-of-extension type of tensile tester was employed. The tensile testing system was a MTS SYNERGY 200 Tensile Tester, which is available from MTS Systems Corporation of Eden Prairie, Minn. The tensile tester was equipped with TESTWORKS 4.08B software from MTS Corporation to support the testing. An appropriate load cell was selected so that the tested value fell within the range of 10-90% of the full scale load. The sample was held between grips having a front and back face measuring 25.4 millimeters×50 millimeters (~1 inch×2 inches). The grip faces were rubberized, and the longer dimension of the grip was perpendicular to the direction of pull. The grip pressure was pneumatically maintained at a pressure of 40 pounds per square inch. The tensile test was run at a 200-millimeter per minute rate (~8 inches per minute) with a gauge length of 50 millimeters (~2 inches) and a break sensitivity of 40%.

Three samples were tested by applying the test load along the machine-direction and three samples were tested by applying the test load along the cross direction. The peak load (recorded per 1 inch of sample width) and peak elongation (i.e., % elongation at peak load) were measured. The peak strip tensile loads from each specimen tested were arithmetically averaged to determine the MD or CD tensile strength.

Pore Size and Volume:

The pore properties of the sample was determined using "Mercury Porosimetry" as substantially described in *Analytical Methods in Fine Particle Technology*, by Webb, Paul & Orr, Clyde. Mercury Porosimetry involves forcing mercury (a non-wetting liquid) into a porous structure under tightly controlled pressures. Because mercury does not wet most substances and will not spontaneously penetrate pores by capillary action, it must be forced into the voids of the sample through external pressure. The pressure required to fill the voids is inversely proportional to the size of the pores. That is, only a small amount of force or pressure is required to fill large voids, whereas a large amount of force or pressure is required to fill voids of very small pores. To perform the test, an AutoPore IV (available from Particle & Surface Sciences Pty., Ltd. of Gosford, New South Wales) was employed that can attain a maximum pressure of 414 MPa (or 60,000 psi). During testing, the sample is placed in a penetrometer, which is bonded to a glass capillary stem with a metal coating. As mercury invades the voids in and around the sample, it moves down the capillary stem. The loss of mercury from the capillary stem results in a change in the electrical capacitance. The change in capacitance during the experiment is converted to volume of mercury using a known stem volume of the penetrometer. Once the test is completed, a graph is developed that plots differential intrusion volume (mL/g/μm) versus pore diameter. The total volume of mercury intruded during an experiment is defined as the "total intrusion volume" (mL/g). The "median pore diameter" is defined as the size (μm) at the $50^{th}$ percentile on the cumulative volume graph. Finally, the "average pore diameter" is defined as the total pore wall area divided by the total pore volume (4V/A).

EXAMPLE 1

Biodegradable films were prepared using an aliphatic-aromatic copolyester available from BASF under the designation "Ecoflex® F BX 7011." Two groups of film samples were prepared. Specifically, one group of film samples ("Sample A") contained the Ecoflex® copolyester and a calcium carbonate filler available from Omya, Inc. under the designation "Omyacarb™ 2sst." The other group of film samples ("Sample B") contained the Ecoflex® copolyester with the Omyacarb™ calcium carbonate filler, a titanium dioxide filler available from DuPont under the designation "R101", and alpha-tocepherol available from Ciba Specialty Chemicals under the designation Irganox® E 201. The composition of each group of samples is set forth in more detail in Table 1.

To form the film samples, the Ecoflex® copolyester was initially dried to 200 ppm and measured using an infrared weight loss moisture analyzer. The raw materials of each group were then compounded using a Werner & Pfleiderer (Ramsey, N.J.) 90 mm twin screw compounding extruder. The calcium carbonate was added by the use of two side feeders that feed the material into the extruder roughly half way down the extruder. The titanium dioxide was fed using a standard single screw feeder that was fed into the feed port of the first side feeder. Using a gear pump the alpha-tocepherol was arranged to drip into the throat of the extruder. A temperature profile was utilized to achieve a melt temperature of 380° F. with a screw speed of 285 RPM. A vacuum was applied near the end of the extruder to pull off moisture and/or low molecular weight material that would cause die build up. Material was pelletized using an underwater pelletization system. The resulting melt flow index ranged from 7 to 9 grams per 10 minutes (measured with a Dynisco melt indexer at a 2.16 kg weight). After compounding, the film samples were extruded using 3.5 inch single screw extruder and a 46-inch die. The extruder has seven temperature zones, a melt pump with controlled temperature, and a die with a controlled temperature. The temperature profile was arranged so that a melt temperature of 348° F. and screw speed of 16 RPMs were achieved. The temperature profile used for casting was as follows: 270° F., 300° F., 310° F., 330° F., 330° F., 330° F. 330° F. (extruder temperatures); 340° F. (melt pump temperature); and 320° F. (die temperature).

The films were placed onto a casting roll where the film was then put into a machine direction orienter (MDO) to be stretched. The MDO was configured for 3 stretch zones with stretch temperature of 120° F. resulting in a stretch ratio of about 4.0. The film was then annealed before leaving the MDO at a temperature of 160 F. Various properties of the stretched films were then tested. The results are set forth below in Tables 1 and 2.

TABLE 1

Liquid/Moisture Transmission and Mechanical Properties

| Sample | Film Composition | | WVTR ($g/m^2/24$ hrs) | MD Elongation (%) | Peak MD Load ($g_f$/in) | Hydrohead (millibar) |
|---|---|---|---|---|---|---|
| A | Ecoflex® | 50.00 wt. % | 6000 | 70 | 1750 | 96.6 |
|   | Omyacarb ™ 2sst | 50.00 wt. % | | | | |
| B | Ecoflex® | 47.95 wt. % | 7500 | 60 | 1600 | 88.7 |
|   | Omyacarb ™ 2sst | 50.00 wt. % | | | | |
|   | $TiO_2$ | 2.00 wt. % | | | | |
|   | Irganox® E 201 | 0.05 wt. % | | | | |
| C | Ecoflex® | 45.95 wt. % | 8600 | 62 | 1765 | — |
|   | Omyacarb ™ 2sst | 50.00 wt. % | | | | |
|   | $TiO_2$ | 4.00 wt. % | | | | |
|   | Irganox® E 201 | 0.05 wt. % | | | | |

TABLE 2

Pore Size and Volume Properties

| Sample | Total Intrusion Volume* (mL/g) | Median Pore Diameter* (μm) | Average Pore Diameter* (μm) |
|---|---|---|---|
| A | 0.1684 | 2.8129 | 2.7244 |
| B | 0.1610 | 3.0334 | 2.9627 |
| C | 0.1293 | 3.5374 | 3.1339 |

As indicated, Sample B (contained primary and secondary fillers) had a higher breathability than Sample A (contained only primary filler). Further, when the total amount of filler is increased by the addition of smaller particles, the total volume of the pores decreased. Conversely, however, the average pore size increased, which indicates that the pore structure became more effective by pore-to-pore connectivity or through an increase in pore size. Furthermore, the tensile properties remained constant despite the fact that the total amount of filler was increased.

EXAMPLE 2

Biodegradable films were prepared using an aliphatic-aromatic copolyester available from BASF under the designation "Ecoflex® F BX 7011." Four groups of film samples were prepared. The first group of film samples ("Sample C") contained the Ecoflex® copolyester and a calcium carbonate filler available from Omya, Inc. under the designation "Omyacarb™ 2sst." The second group of film samples ("Sample D") contained the Ecoflex® copolyester, the "Omyacarb™ 2sst" calcium carbonate filler, and a titanium dioxide filler available from DuPont under the designation "R101." The third group of film samples ("Sample E") contained the Ecoflex® copolyester and a micritic calcium carbonate filler available from Specialty Minerals, Inc. under the designation "MD1517." Finally, the fourth group of film samples ("Sample F") contained the Ecoflex® copolyester, the "MD1517" micritic calcium carbonate filler, and the "R101" titanium dioxide filler. The composition of each group of samples is set forth in more detail in Table 3.

To form the film samples, the Ecoflex® copolyester was initially dried to 100 ppm using a ConAir desiccant dryer and measured using an Arizona Instruments Computrac Vapor Pro moisture analyzer. The raw materials of each group were then compounded using a Werner & Pfleiderer (Ramsey, N.J.) ZSK-30 twin screw compounding extruder. A temperature profile was used to result in a melt temperature of 200 C and a screw speed of 150 RPM was utilized. A 4-hole strand die placed the stands onto a cooling belt before being pelletized. The resulting melt flow index ranged from 5 to 7 grams per 10 minutes (measured with a Tinius Olson melt indexer with a 2.16 kg weight). After compounding, the film samples were extruded using a HAAKE (Thermo Electron Corporation, Woburn, Mass.) Rheocord 90 benchtop single screw extruder having an 8-inch die. The extruder had three temperature zones, a melt pump with controlled temperature, and a die with a controlled temperature. The temperature profile was arranged so that a melt temperature of 175° C. and screw speed of 85 RPMs were achieved. The temperature profile used for casting was as follows: 160° C., 170° C., and 170° C. (extruder temperatures); 170° C. (melt pump temperature); and 160° C. (die temperature).

Each film was then cut into sheets measuring about 14.0 centimeters wide by about 16.0 centimeters long. The films were stretched to about 470% (strain) of its original length at a rate of 840 millimeters/minute, which resulted in a stretch of 2200% per minute and a draw of 350%. The stretched films had a thickness ranging from 1.0 to 2.0 mils (i.e., from about 25 to about 50 micrometers). Various properties of the stretched films were then tested. The results are set forth below in Table 3.

TABLE 3

Properties of Stretched Film Samples

| Sample | Film Composition | | WVTR (g/m²/24 hrs) |
|---|---|---|---|
| C | Ecoflex ® | 50.00 wt. % | 6020 |
|   | Omycarb ™ 2sst | 50.00 wt. % |   |
| D | Ecoflex ® | 50.00 wt. % | 6318 |
|   | Omyacarb ™ 2sst | 48.00 wt. % |   |
|   | TiO$_2$ | 2.00 wt. % |   |
| E | Ecoflex ® | 50.00 wt. % | 7150 |
|   | MD1517 | 50.00 wt. % |   |
| F | Ecoflex ® | 50.00 wt. % | 8974 |
|   | MD1517 | 48.00 wt. % |   |
|   | TiO$_2$ | 2.00 wt. % |   |

Figure 5:
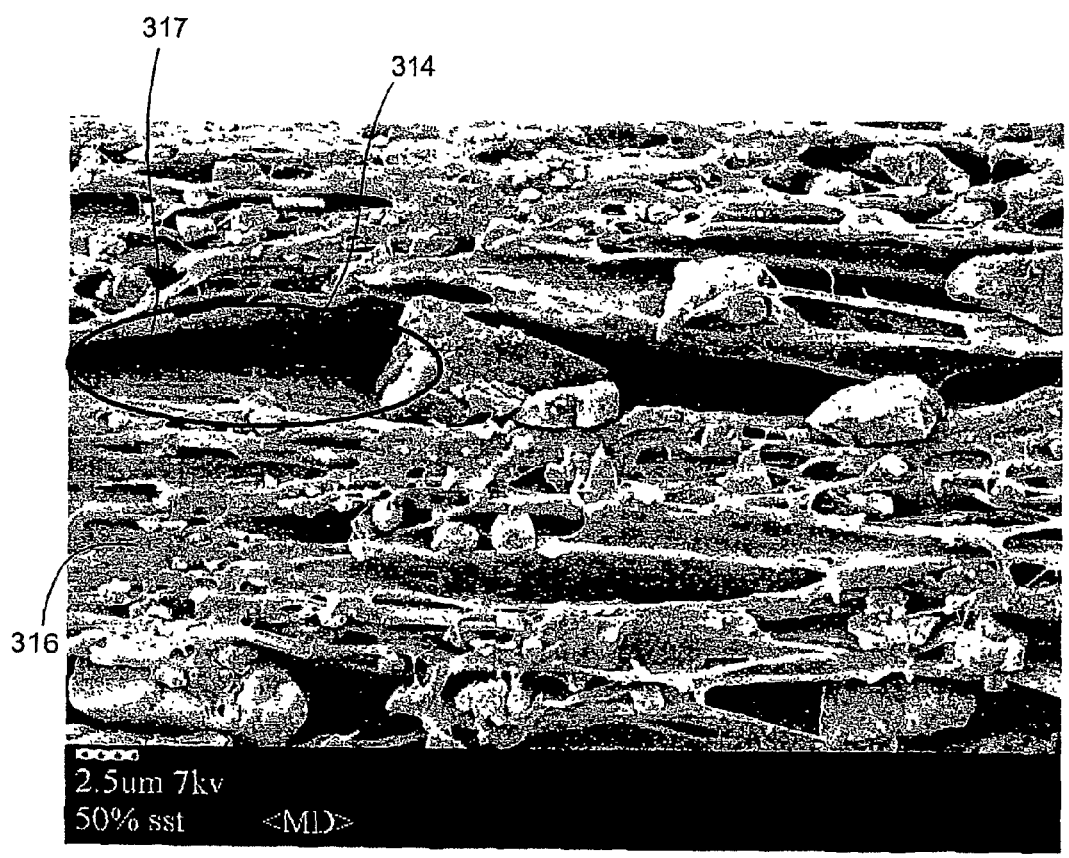
FIG. 5 is an SEM microphotograph (7 kv) of Sample C formed in Example 2 (contained only calcium carbonate filler)
Figure 6:
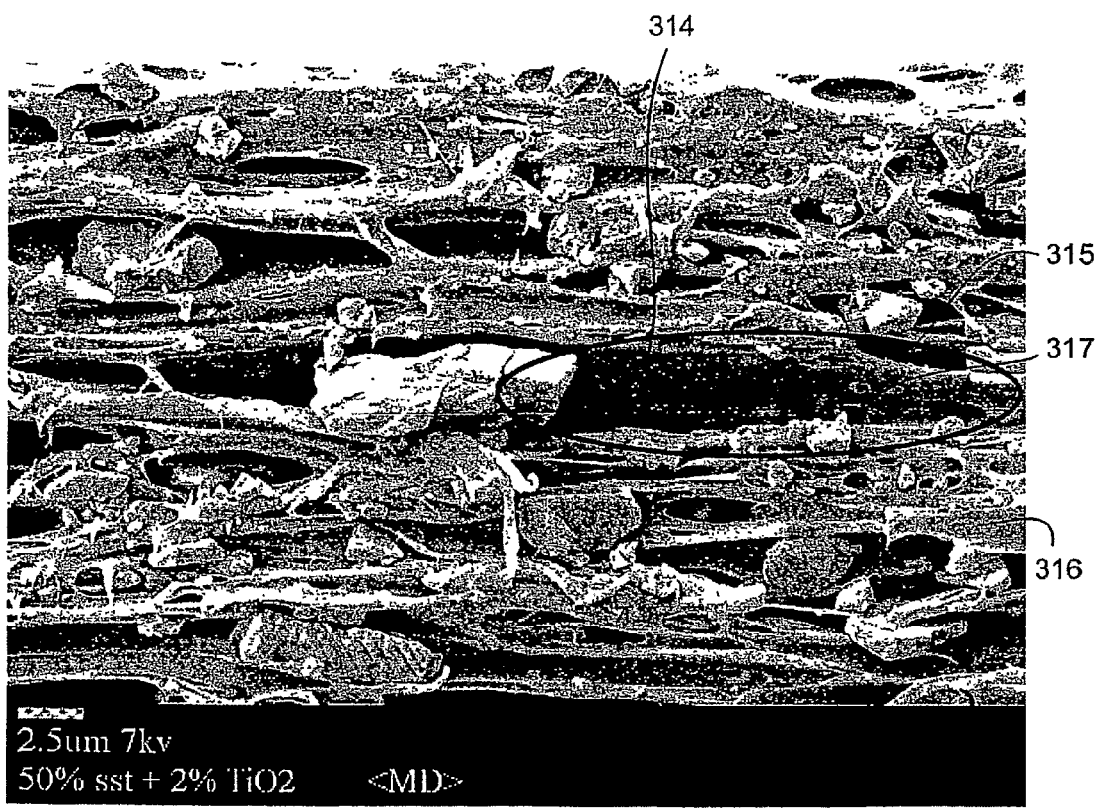
FIG. 6 is an SEM microphotograph (7 kv) of Sample D formed in Example 2 (contained calcium carbonate and titanium dioxide fillers).

As indicated, Sample D (contained primary and secondary fillers) had a higher breathability than Sample C (contained only primary filler). Likewise, Sample F (contained primary and secondary fillers) had a higher breathability than Sample E (contained only primary filler). SEM photographs of Samples C and D are shown in FIGS. 5-6, respectively. As shown in FIG. 5, Sample C contained a biodegradable polymer matrix 316 within which are formed large pores 314 (one of which is indicated by a circle drawn around the pore). However, little or no pore formation existed at the cell walls 317 of the large pores 314. In contrast, as shown in FIG. 6, Sample D contained a biodegradable polymer matrix 316 within which are formed small pores 315 and large pores 314 (one of which is indicated by a circle drawn around the pore). The small pores 315 are formed at the cell walls 317 of the large pores 314, thereby providing additional passageways for the transmission of water vapor. As shown, the encircled large pore 314 has a length of approximately 15 micrometers, while the small pore 315 has a length of approximately 5 micrometers.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A breathable film having a base layer comprising first filler particles and second filler particles dispersed within a biodegradable polymer matrix that includes an aliphatic-aromatic copolyester, the first filler particles constituting from about 25 wt. % to about 75 wt. % of the base layer and the second filler particles constituting from about 0.1 wt. % to about 10 wt. % of the base layer, wherein the ratio of the average size of the first filler particles to the average size of the second filler particles is from about 2 to about 100, and wherein the film exhibits a water vapor transmission rate of about 2,000 g/m²/24 hours or more and a peak load in the machine direction of about 800 grams-force per inch or more, further wherein the base layer has a pore structure that includes first pores and second pores, the second pores being smaller than the first pores, wherein the first pores have an average length of from about 5 to about 100 micrometers and the second pores have an average length of from about 0.5 to about 5 micrometers.

2. The breathable film of claim 1, wherein the ratio of the average size of the first filler particles to the average size of the second filler particles is from about 5 to about 50.

3. The breathable film of claim 1, wherein the ratio of the average size of the first filler particles to the average size of the second filler particles is from about 10 to about 20.

4. The breathable film of claim 1, wherein the first filler particles have an average particle size of from about 0.5 to about 10 micrometers and the average size of the second filler particles is from about 0.01 to about 5 micrometers.

5. The breathable film of claim 1, wherein the first filler particles have an average particle size of from about 2 to about 6 micrometers and the average size of the second filler particles is from about 0.1 to about 1 micrometer.

6. The breathable film of claim 1, wherein the first filler particles and the second filler particles together constitute from about 30 wt. % to about 75 wt. % of the base layer.

7. The breathable film of claim 1, wherein the first filler particles and the second filler particles together constitute from about 40 wt % to about 65 wt. % of the base layer.

8. The breathable film of claim 1, wherein the first filler particles constitute from about 40 wt. % to about 60 wt. % of the base layer.

9. The breathable film of claim 1, wherein the second filler particles constitute from about 1 wt. % to about 4 wt. % of the base layer.

10. The breathable film of claim 1, wherein the first filler particles contain calcium carbonate.

11. The breathable film of claim 10, wherein the calcium carbonate has a purity of at least about 95 wt. %.

12. The breathable film of claim 10, wherein the calcium carbonate is Caribbean micritic calcium carbonate.

13. The breathable film of claim 1, wherein the second filler particles contain titanium dioxide.

14. The breathable film of claim 1, wherein the biodegradable polymer matrix contains a polymer having a glass transition temperature of about 0° C. or less.

15. The breathable film of claim 1, wherein the biodegradable polymer matrix contains a polymer having a melting point of about 80° C. to about 160° C.

16. The breathable film of claim 1, wherein the biodegradable polymer matrix contains a polymer having a number average molecular weight of from about 50,000 to about 100,000 Daltons and a weight average molecular weight of from about 75,000 to about 150,000 Daltons.

17. The breathable film of claim 1, wherein the biodegradable polymer matrix constitutes from about 25 wt. % to about 70 wt. % of the base layer.

18. The breathable film of claim 1, wherein the biodegradable polymer matrix constitutes from about 35 wt. % to about 60 wt. % of the base layer.

19. The breathable film of claim 1, further comprising a lubricant.

20. The breathable film of claim 1, wherein the water vapor transmission rate of the film is about 5,000 grams/m$^2$-24 hours or more.

21. The breathable film of claim 1, wherein the water vapor transmission rate of the film is about 7,000 grams/m$^2$-24 hours or more.

22. The breathable film of claim 1, wherein the film exhibits a peak load in the machine direction of about 1200 grams-force per inch or more.

23. The breathable film of claim 1, wherein the film exhibits a peak load in the machine direction of about 1500 grams-force per inch or more.

24. The breathable film of claim 1, wherein the film has a pore volume that is less than the pore volume of an otherwise identical film that lacks the second filler particles.

25. The breathable film of claim 1, wherein the aliphatic-aromatic copolyester is synthesized from at least one aliphatic dicarboxylic acid and at least one aromatic dicarboxylic acid.

26. A breathable laminate comprising a nonwoven web material laminated to the film of claim 1.

27. An absorbent article comprising an absorbent core positioned between a substantially liquid-impermeable layer and a liquid-permeable layer, wherein the substantially liquid-impermeable layer contains the breathable laminate of claim 26.

28. The absorbent article of claim 27, wherein the substantially liquid-impermeable layer forms an outer cover of the absorbent article.

29. A method for forming a breathable film, the method comprising:
compounding a biodegradable aliphatic-aromatic copolyester, first filler particles, and second filler particles to form a polymer composition, the first filler particles constituting from about 25 wt. % to about 75 wt. % of the polymer composition and the second filler particles constituting from about 0.1 wt. % to about 10 wt. % of the polymer composition, wherein the ratio of the average size of the first filler particles to the average size of the second filler particles is from about 2 to about 100;
extruding the polymer composition to form a precursor film; and
stretching the precursor film in the machine direction, cross-machine direction, or both, wherein the stretched film exhibits a water vapor transmission rate of about 2,000 g/m$^2$/24 hours or more and a peak load in the machine direction of about 800 grams-force per inch or more, further wherein the stretched film has a pore structure that includes first pores and second pores, the second pores being smaller than the first pores, wherein the first pores have an average length of from about 5 to about 100 micrometers and the second pores have an average length of from about 0.5 to about 5 micrometers.

30. The method of claim 29, further comprising drying the biodegradable aliphatic-aromatic copolyester to a moisture content of about 500 parts per million or less prior to compounding.

31. The method of claim 29, wherein the precursor film is stretched in the machine direction at a draw ratio of from about 2.0 to about 6.0.

32. The method of claim 29, wherein the precursor film is stretched at a temperature of from about 15° C. to about 60° C.

33. The method of claim 29, further comprising bonding the stretched film to a nonwoven web material to form a laminate.

34. The method of claim 29, wherein the ratio of the average size of the first filler particles to the average size of the second filler particles is from about 5 to about 50.

35. The method of claim 29, wherein the first filler particles have an average particle size of from about 0.5 to about 10 micrometers and the average size of the second filler particles is from about 0.01 to about 5 micrometers.

36. The method of claim 29, wherein the first filler particles have an average particle size of from about 2 to about 6 micrometers and the average size of the second filler particles is from about 0.1 to about 1 micrometer.

37. The method of claim 29, wherein the first filler particles and the second filler particles together constitute from about 30 wt. % to about 75 wt. % of the polymer composition.

38. The method of claim 29, wherein the first filler particles constitute from about 40 wt. % to about 60 wt. % of the polymer composition.

39. The method of claim 29, wherein the second filler particles constitute from about 1 wt. % to about 4 wt. % of the polymer composition.

40. The method of claim 29, wherein the water vapor transmission rate of the film is about 5,000 grams/m$^2$-24 hours or more.

41. The method of claim 29, wherein the water vapor transmission rate of the film is about 7,000 grams/m$^2$-24 hours or more.

42. The method of claim 29, wherein the film exhibits a peak load in the machine direction of about 1200 grams-force per inch or more.

43. The method of claim 29, wherein the film exhibits a peak load in the machine direction of about 1500 grams-force per inch or more.

44. The method of claim 29, wherein the film has a pore volume that is less than the pore volume of an otherwise identical film that lacks the second filler particles.

* * * * *